US010303186B2

United States Patent
Wang

(10) Patent No.: US 10,303,186 B2
(45) Date of Patent: May 28, 2019

(54) UNMANNED SPATIAL VEHICLE PERFORMANCE

(71) Applicant: Chengwen Chris Wang, Las Vegas, NV (US)

(72) Inventor: Chengwen Chris Wang, Las Vegas, NV (US)

( * ) Notice: Subject to any disclaimer, the term of this patent is extended or adjusted under 35 U.S.C. 154(b) by 25 days.

(21) Appl. No.: 15/473,488

(22) Filed: Mar. 29, 2017

(65) Prior Publication Data

US 2017/0285664 A1    Oct. 5, 2017

Related U.S. Application Data

(60) Provisional application No. 62/314,954, filed on Mar. 29, 2016.

(51) Int. Cl.
| | | |
|---|---|---|
| G05D 1/10 | (2006.01) | |
| G01S 13/93 | (2006.01) | |
| G05D 1/00 | (2006.01) | |
| G06K 9/00 | (2006.01) | |
| G08G 5/00 | (2006.01) | |

(Continued)

(52) U.S. Cl.
CPC ............ *G05D 1/104* (2013.01); *B64C 37/02* (2013.01); *B64C 39/024* (2013.01); *B64D 45/00* (2013.01); *B64D 47/02* (2013.01); *G01S 13/9303* (2013.01); *G01S 15/93* (2013.01); *G08G 5/0013* (2013.01); *G08G 5/0043* (2013.01); *G08G 5/0069* (2013.01); *G08G 5/025* (2013.01); *G08G 5/045* (2013.01); *B64C 2201/027* (2013.01); *B64C 2201/108* (2013.01); *B64C 2201/12* (2013.01); *B64C 2211/00* (2013.01); *B64D 2203/00* (2013.01)

(58) Field of Classification Search
CPC ... B64C 39/024; B64C 37/02; B64C 2201/12; B64C 2201/027; B64C 2211/00; G01S 15/93; G01S 13/9303; B64D 45/00; B64D 47/02; B64D 2203/00; G08G 5/0013; G08G 5/0043; G08G 5/025; G08G 5/045

See application file for complete search history.

(56) References Cited

U.S. PATENT DOCUMENTS

| | | | | |
|---|---|---|---|---|
| 5,521,817 A | * | 5/1996 | Burdoin | G05D 1/0027 244/190 |
| 5,728,965 A | * | 3/1998 | Fesland | B64C 39/024 244/190 |

(Continued)

*Primary Examiner* — Mussa A Shaawat
(74) *Attorney, Agent, or Firm* — Redbrick IP, P.C.

(57) ABSTRACT

A system and method for participating in a multi-USV performance in three-dimensional space. The USV can include: a computer processor; a sensory device configured to detect live sensory information relative to a second USV participating in the performance in proximity to the USV; and a spatial control module executing on the computer processor and configured to enable the computer processor to: (i) receive instructions for performing a pre-determined sequence of spatial maneuvers of the performance; (ii) begin execution of the pre-determined sequence of spatial maneuvers according to the instructions; (iii) identify a modified sequence of spatial maneuvers calculated based on the live sensory information from the sensory device; (iv) halt execution of the pre-determined sequence of spatial maneuvers; and/or (v) execute the modified sequence of spatial maneuvers.

20 Claims, 10 Drawing Sheets

(51) Int. Cl.
*G08G 5/04* (2006.01)
*B64C 39/02* (2006.01)
*B64D 45/00* (2006.01)
*B64D 47/02* (2006.01)
*B64C 37/02* (2006.01)
*G08G 5/02* (2006.01)
*G01S 15/93* (2006.01)

(56) References Cited

U.S. PATENT DOCUMENTS

| | | | |
|---|---|---|---|
| 6,926,233 B1 * | 8/2005 | Corcoran, III | B64C 13/20 |
| | | | 244/76 R |
| 6,963,795 B2 * | 11/2005 | Haissig | G08G 5/0008 |
| | | | 342/104 |
| 8,781,727 B1 * | 7/2014 | Bonawitz | G05D 1/104 |
| | | | 701/410 |
| 8,977,481 B1 * | 3/2015 | Downs | G08G 5/0017 |
| | | | 701/120 |
| 9,104,201 B1 | 8/2015 | Pillai et al. | |
| 2007/0288132 A1 | 12/2007 | Lam | |

\* cited by examiner

UNMANNED SPATIAL VEHICLE PERFORMANCE

CROSS-REFERENCE TO RELATED APPLICATION

This application claims the benefit of U.S. Provisional Patent Application Ser. No. 62/314,954, filed on Mar. 29, 2016, and entitled "A System and Method for Consistently Replaying Visual Effects Provided by a Group of USVs," U.S. Provisional Patent Application Ser. No. 62/314,954 is incorporated by reference herein in its entirety.

BACKGROUND

Due to recent advancements in robotics, aeronautics, wireless technology, sensor technology, and battery technology, many tasks that were previously performed by human labor and mechanical means are now performed by specialized autonomous devices. These devices have disrupted entire industries, from manufacturing and assembly to logistics and supply chain. The most obvious and least complex of these autonomous systems involve environments that are highly controlled and deterministic in nature. Certain other applications have been slower to adopt computerized automation. These typically involve dynamically evolving requirements and require complex adaptation to external stimuli. Despite these challenges, a wide range of industries, including those in the consumer and entertainment space, are beginning to incorporate computerized automation.

Examples include self-driving cars and unmanned aerial vehicle (UAV) delivery services, which are both attracting significant resource and investment. UAVs in particular, also known as "drones," have advanced significantly in recent years. In the past, UAVs were limited to research, military, and other niche applications due to their high cost, restrictions by government aviation agencies, and limited capabilities. Modern UAVs are capable of carrying heavier payloads, traveling greater distances, and providing more sensory information than ever before. Other applications of UAV technology include real-time meteorology devices and atmospheric satellites providing Internet access and wireless services to remote geographical locations around the world.

For unmanned vehicles, such as UAVs, this shift to more sophisticated applications is accelerating as governments amend regulatory frameworks that were primarily designed for the regulation of passenger aircraft. Thus, efforts are underway to ease the regulatory burden of developing unmanned vehicle technologies. For example, in the United States, the Federal Aviation Authority has implemented rules to specifically define operational limitations of UAVs and certification requirements of UAV pilots.

These advancements have together incentivized industry experts to invest in faster development of unmanned vehicle technologies, as well as innovative new applications of those technologies in the consumer and commercial space.

SUMMARY

In general, in one aspect, embodiments relate to systems and methods for a recreational performance involving one or more unmanned spatial vehicles (USVs). These performances can include synchronized audio-visual outputs which, when executed by a set of coordinated UAVs, result in an appealing performance for spectators.

In general, in one aspect, embodiments relate to a USV for participating in a multi-USV performance in three-dimensional space. The USV can include: a computer processor; a sensory device configured to detect live sensory information relative to a second USV participating in the performance in proximity to the USV; and a spatial control module executing on the computer processor and configured to enable the computer processor to: (i) receive instructions for performing a pre-determined sequence of spatial maneuvers of the performance; (ii) begin execution of the pre-determined sequence of spatial maneuvers according to the instructions; (iii) identify a modified sequence of spatial maneuvers calculated based on the live sensory information from the sensory device; (iv) halt execution of the pre-determined sequence of spatial maneuvers; and/or (v) execute the modified sequence of spatial maneuvers.

In general, in one aspect, embodiments relate to a system for coordinating a multi-USV performance involving a set of USVs operating in three-dimensional space. The system can include: a computer processor; a spatial coordination module executing on the computer processor and configured to enable the computer processor to: (i) transmit, to the set of coordinated USVs, separate instructions for performing a pre-determined sequence of spatial maneuvers; (ii) receive, during the performance, live sensory information from a sensory device of a first USV of the set of coordinated USVs, wherein the live sensory information is relative to a second USV of the set of coordinated USVs participating in the performance in proximity to the first USV; (iii) calculate a modified sequence of spatial maneuvers based on the live sensory information; and (iv) transmit the modified sequence of spatial maneuvers to a subset of the coordinated USVs.

In general, in one aspect, embodiments relate to a method for participating in a multi-USV performance in three-dimensional space. The method can include: beginning execution of the performance by a set of coordinated USVs; detecting, independently and by a subset of the coordinated USVs, a failure of a first USV in executing a portion of the performance, wherein the subset of the coordinated USVs are in proximity to the first USV; propagating distributed communication of the failure, by the subset of the coordinated USVs, to a remainder of the set of coordinated USVs; independently calculating, by at least a second USV of the set of coordinated USVs, modifications to the performance based on receiving distributed communication of the failure; and executing a portion of the modifications to the performance by the second USV.

Other embodiments will be apparent from the following description and the appended claims.

BRIEF DESCRIPTION OF THE DRAWINGS

Embodiments are illustrated by way of example, and not by way of limitation, in the figures of the accompanying drawings and in which like reference numerals refer to similar elements.

DETAILED DESCRIPTION

Figure 1:
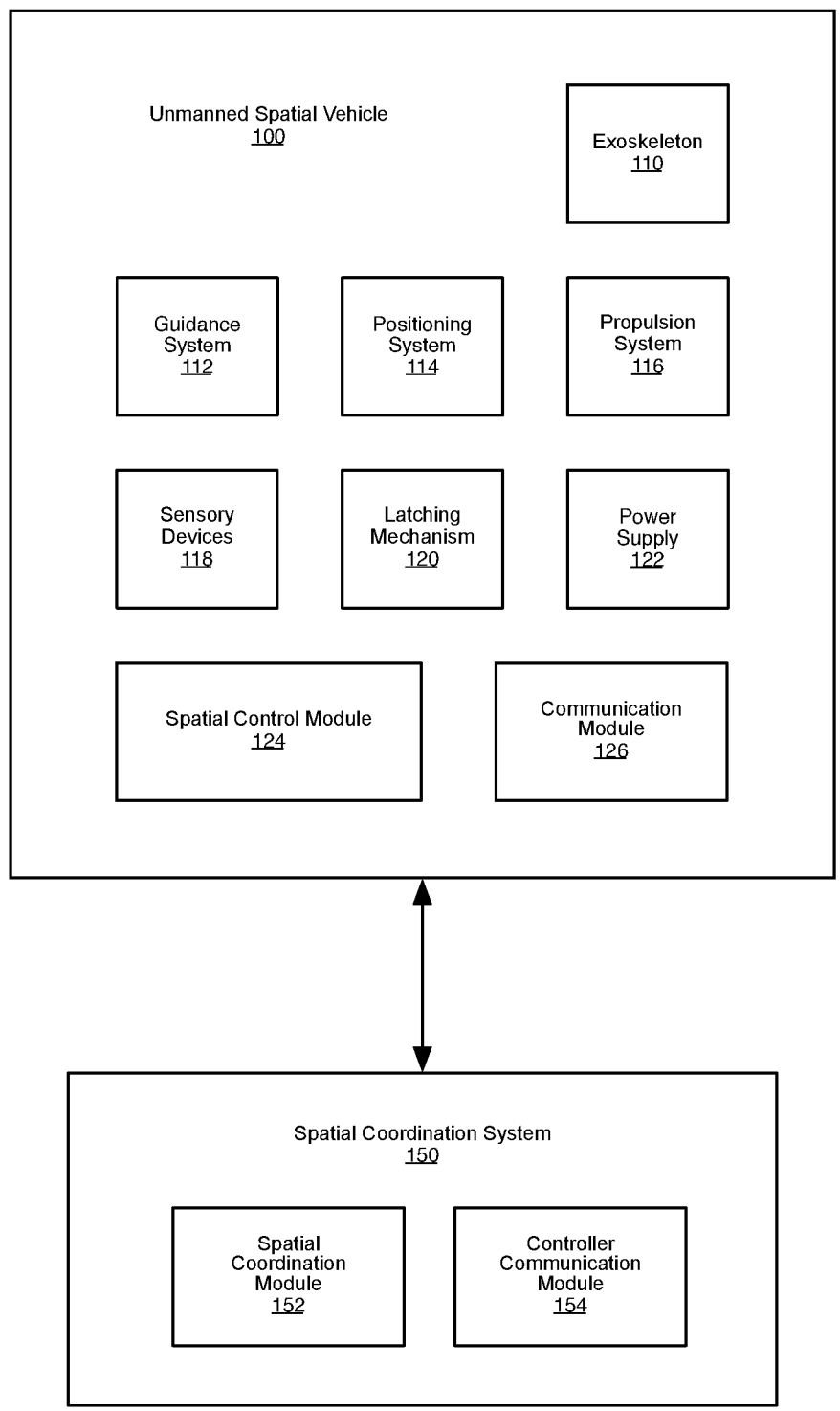
FIGS. 1 and 2 show schematic diagrams of systems, in accordance with one or more embodiments.

A portion of the disclosure of this patent document may contain material that is subject to copyright protection. The copyright owner has no objection to the facsimile reproduction by anyone of the patent document or the patent disclosure, as it may appear in the Patent and Trademark Office patent file or records, but otherwise reserves all copyrights whatsoever.

Specific embodiments will now be described in detail with reference to the accompanying figures. Like elements in the various figures are denoted by like reference numerals for consistency. In the following detailed description of embodiments, numerous specific details are set forth in order to provide a more thorough understanding of the invention. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It will be apparent to one of ordinary skill in the art that the invention can be practiced without these specific details. In other instances, well-known features have not been described in detail to avoid unnecessarily complicating the description.

In general, embodiments of the present disclosure provide a method and system for performing a spatial performance involving a set of coordinated unmanned spatial vehicles (USVs). The USVs can coordinate using various forms of distributed communication or can be coordinated using one or more central and/or external spatial coordination modules to transmit data and/or respond to live sensory information. During the spatial performance, at least some subset of the USVs may dock to create one or more docked USV structures. One or more of the USVs may further collect sensory information that may be used to modify pre-determined operating plan(s) of the spatial performance.

FIG. 1 shows a system including a USV 100 and a spatial coordination system 150, in accordance with one or more embodiments. As shown in FIG. 1, the USV 100 has multiple components including an exoskeleton 110, guidance system 112, positioning system 114, propulsion system 116, one or more sensory devices 118, latching mechanism 120, power supply 122, spatial control module 124, and communication module 126. Also shown in FIG. 1, the spatial coordination system 150 includes multiple components including a spatial coordination module 152 and a controller communication module 154. Various components of the system of FIG. 1 can be located on the same device (e.g., the USV 100, an external server, desktop personal computer (PC), laptop, telephone, mobile phone, kiosk, and any other device) or can be located on separate devices connected by a network (e.g., radio frequency, Wi-Fi, Bluetooth, local area network, the Internet, etc.). Those skilled in the art will appreciate that there can be more than one of each separate component running on a device, as well as any combination of these components within a given embodiment.

For purposes of this disclosure, an unmanned spatial vehicle (USV) can be any unmanned device that is capable of maneuvering in a three-dimensional space in response to instructions. The space can include aerial, terrestrial, terranean, aquatic and/or subterrestrial space. Examples of a USV can include, but are not limited to, an unmanned aerial vehicle (UAV, i.e., "drone"), a remotely operated underwater vehicle (ROUV), a radio-controlled aircraft (RC aircraft), and any other device capable of unmanned spatial movement. Many of the foregoing examples will, for illustrative purposes, be described with reference to embodiments involving one or more UAVs coordinated to perform an aerial flight performance. Such illustrative discussions are not intended to be exhaustive or to exclude application of the disclosed embodiments to other types of USVs in other spatial environments, of which there are many. The embodiments were chosen and described in order to best explain the principles of the invention and its practical applications, to thereby enable others skilled in the art to best utilize the invention and various embodiments with various modifications as may be suited to the particular use contemplated.

In one example, the USV 100 may be a UAV operating as a "flying pixel" in three-dimensional space. The flying pixel can be implemented using a UAV with an exoskeleton bumper guard and any number of light sources (e.g., LEDs, or Light-Emitting Diodes) thereon. It should also be appreciated that while visual effects caused by lights visible to the human eye are discussed in the present disclosure, one or more embodiments are not limited to visible lights. For example, one or more drone elements (e.g., UAV, ROV, light pixel, and so on) may emit/broadcast infrared or ultraviolet light. It should also be appreciated that embodiments are not limited to visual effects. For example, one or more drone elements may emit/broadcast sounds. It should also be appreciated that embodiments are not limited to emitting/broadcasting. For example, one or more drone elements may observe/record sounds and/or visuals. A swarm, or group, may refer to two or more USVs.

In one or more embodiments, the spatial control module 124 is a specialized component of the USV configured to execute business logic and functionality required for operation of the USV. The spatial control module 124 may be implemented as a combination of software and/or hardware devices that are operatively connected to each other as well as other components of the USV. For example, the spatial control module 124 may be implemented as a microcontroller programmed for communication with the sensors and devices of the USV.

In one or more embodiments, the spatial coordination module 152 is a specialized device configured to execute business logic and functionality for communicating, either offline or online, with one or more USVs configured to participate in a multi-USV performance. Offline communication by the spatial coordination module 152 refers to communication with one or more coordinated USVs prior to the spatial performance. This can involve a wireless or direct-wired connection mechanism between the spatial coordination module 152 and the USV, and can include pre-programming instructions for operation of the USV during the spatial performance. Online communication by the spatial coordination module 152 refers to communication with one or more coordinated USVs in realtime, during to the spatial performance.

In one or more embodiments, the propulsion system 116 is any device or collection of devices configured to propel the USV during the performance. The propulsion system 116 can include any number of motors, engines, propellers, rotor blades and/or other apparatus required for enabling movement by the USV. For example, a "drone", or UAV can include rotors that enable it to fly and to perform any number of aerial maneuvers during execution of a flight performance.

In one or more embodiments, the power supply 122 is operatively connected to any number of other components of the USV in order to provide energy necessary for operation of those components. The power supply 122 can include battery, gas, related logic and delivery devices and/or other means of power storage and delivery necessary for operation of the USV 100.

Figure 2:
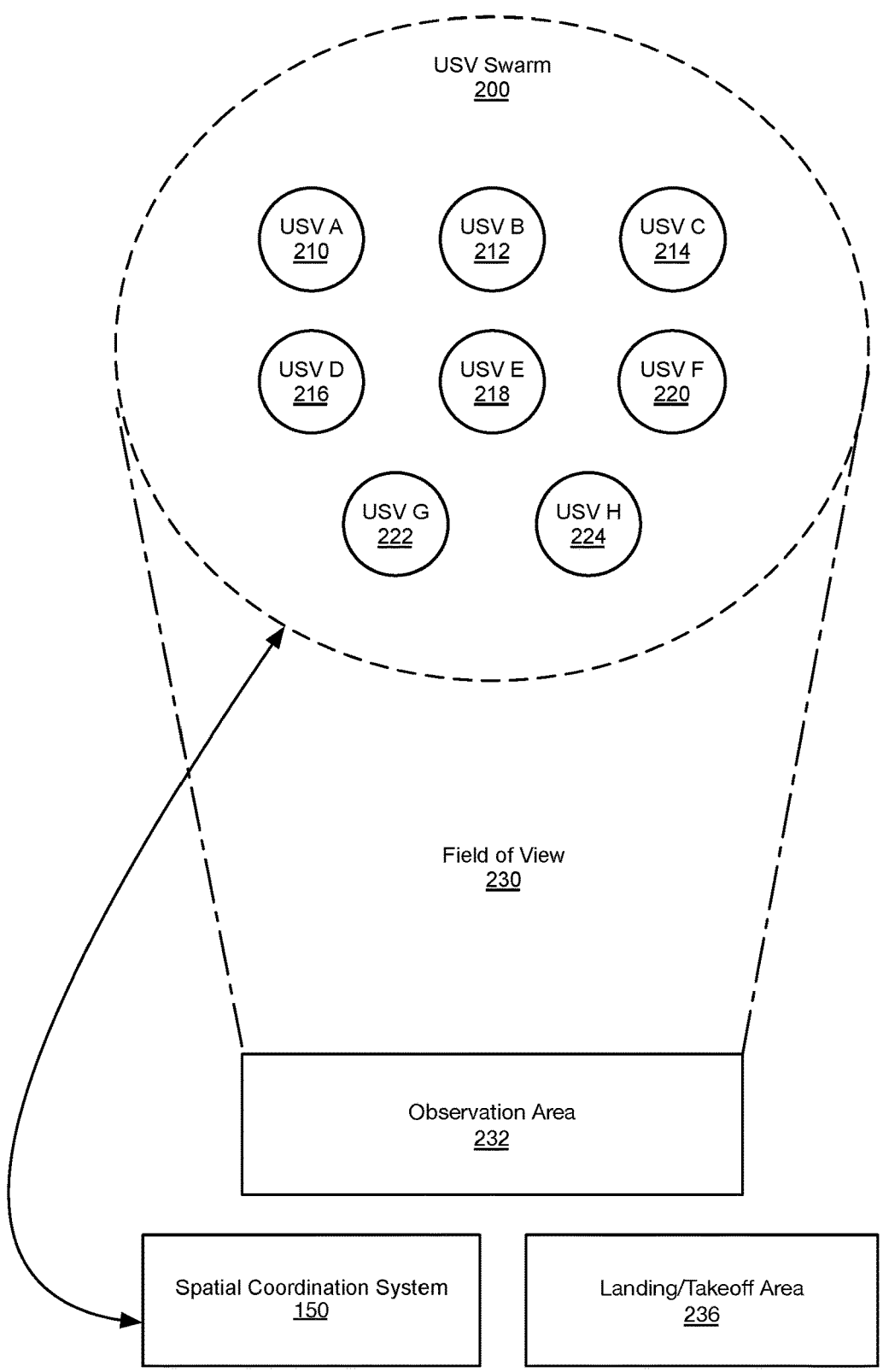

FIG. 2 shows a system including a USV swarm 200, a spatial coordination module 152, a landing/takeoff area 236, and an observation area 232, in accordance with one or more embodiments. As shown in FIG. 2, the USV swarm 200 can include any number of USVs (e.g., USV A 210, USV B 212, USV C 214, USV D 216, USV E 218, USV F 220, USV G 222, and USV H 224). Various components of the system of FIG. 2, such as the spatial coordination module 152, can be located on the same device (e.g., an individual "master" USV, an external server, desktop personal computer (PC), laptop, telephone, mobile phone, kiosk, and any other device) or can be located on separate devices connected by a network. For example, the spatial coordination module can be implemented as a distributed system running on the USVs of the USV swarm 200, in accordance with various embodiments. Those skilled in the art will appreciate that there can be more than one of each separate component running on a device, as well as any combination of these components within a given embodiment.

In one embodiment, a system and method to guide large number of USVs into designated places to form object shapes in three-dimensional space and/or to produce visual, auditory, or other output as part of a performance is disclosed. Each USV may be configured to follow a predetermined three-dimensional trajectory in synchronized time. The observation area 232 may be oriented such that an audience is able to view the performance within the boundaries of the field of view 230. In some embodiments, the performance is performed without realtime modification capability or without requiring realtime modification. The performance may be calculated offline and optionally manually fine-tuned. In other embodiments, the spatial performance is automatically adjusted based on realtime feedback from one or more sensors, previous flight results, and/or environmental stimuli.

The coordinated USVs may be configured to operate very closely in the USV swarm 200. The possibility of collision may be allowed and mitigated by features of the USVs such as dampening mechanisms discussed herein. Collisions may be caused by mechanical failure, weather, external obstruction, built-in imprecision or lack of precision in guidance/positioning, docking failure, or any other factor potentially impacting execution of the flight performance by the USVs. Collision response may also be performed in accordance with various embodiments. In one embodiment, the gap between the USVs is smaller than each USV's diameter such that when viewed from the outside, the audience may see one dense 3D structure from the observation area 232. In another embodiment, due to tight proximity of the USVs to one another, optical outputs from the USVs (such as LED lights) appear as a continuous light field when viewed from the observation area 232.

Flight Control

With reference to FIGS. 1 and 2, in one or more embodiments, the spatial control module 124 of the USV 100 includes functionality to receive instructions for performing a pre-determined sequence of maneuvers of the spatial performance.

Offline Instructions

In one or more embodiments, the spatial control module 124 includes functionality to execute instructions defining the USV's participation in a spatial performance in coordination with other USVs of the USV swarm 200. The spatial coordination module 152 can be configured to transmit the instructions offline to one or more USVs prior to commencement of the spatial performance. In one embodiment, the spatial coordination module 152 does not have online access to the USVs during the spatial performance. The instructions can include definition of one or more spatial path waypoints, maneuvers, sensory data collections, sensory signal outputs, synchronization points, orientation data, thrust and propulsion data and/or any other information required for the USV's participation in the spatial performance.

In one embodiment, each waypoint includes one or more of: (1) the identification of a particular USV (2) a timestamp (3) a coordinate or a region (4) the tilt and angle of the USV and (5) a safety margin (the minimum distance the USV should maintain with the surrounding USVs). When a USV is coupled with another USV (i.e., docked), the safety margin may be zero.

For example, for each of the coordinated USVs, an administrator may input a series of waypoints. The spatial coordination module can then compute a valid spatial path so that each USV may navigate to each of the waypoints at a specified synchronization time. The waypoint may not necessarily be a coordinate, but may be a region, which may only require the USV to be somewhere in that region at the specified time.

In one or more embodiments, for each of the waypoints, the spatial coordination module 152 is configured to perform any number of the following checks: (1) For certain pairs of waypoints, the USVs may not occupy the same space at the same time (this may include USVs within a predefined timestamp threshold, since at least one of the USVs must have sufficient time to move away from the waypoint) (2) Each USV may have a maximum speed, and each USV may be given sufficient time to move from one waypoint to another.

In one or more embodiments, for each of the USVs, the spatial coordination module 152 may gather all waypoints for that particular USV. Next, the spatial coordination module 152 may create one or more intermediate nodes based on the distance between successive waypoints. The spatial coordination module 152 may create the minimum number of intermediate nodes such that no individual segment of the path exceeds a maximum distance threshold. The farther the distance is, the more intermediate nodes may be created. Each intermediate node may have a (1) USV identification, (2) a timestamp (3) a coordinate and/or (4) the tilt and the angle of the USV. Each USV may move through each intermediate node in order of the timestamps.

For illustrative purposes, the segment between pairs of successive intermediate nodes can be called an "intermediate segment." The duration between the beginning and the ending timestamp of these two nodes may be called the intermediate segment timeframe.

In one embodiment, the spatial coordination module 152 is configured to compute the timestamp and coordinate of each node using a mathematical optimization method (e.g., sequential quadratic programming). The spatial coordination module 152 may, for each intermediate segment, construct equations describing its bounding rectangle box. The size of the bounding box may be decided by the minimum distance each USV is desired to keep. For each pair of intermediate paths, an administrator may define input constraints to ensure the bounding cylinders with intersecting timeframes do not intersect with each other. The following additional constraints can also be used: (i) constraints limiting the maximum speed and acceleration for each USV, (ii) constraints limiting the maximum rotational speed for each USV, and/or (iii) constraints limiting the maximum flight time so the USVs do not run out of battery. In one or more embodiments, the spatial coordination module 152 is configured to input one or more of these constraints into sequential quadratic programming while optimizing for a combination of (1) time for USVs to reach their final waypoint, (2) battery efficiency, and (3) distance threshold between proximal USVs. When a solution is not found on the first attempt, the spatial coordination module 152 may proceed to double the number of intermediate nodes and to repeat this process as necessary.

Interruption

In one or more embodiments, the spatial control module 124 includes functionality to halt/suspend execution of the spatial performance by the USV in response to an interruption. The interruption can include a collision event or any other input or deviation from the intended performance. After the interruption, the spatial control module 124 may either resume the spatial performance by advancing execution of instructions according to the system time (e.g., at a synchronization point) or determine whether modification of the spatial performance of the USV is necessary. For example, the spatial control module 124 may receive sensory data from the sensory devices 118 indicating that one or more proximal USVs have failed during execution of the spatial performance, and may calculate and execute a modified operating plan to mitigate for their absence.

Live Sensory Information

In one or more embodiments, the USV includes any number of sensory devices 118. Examples of sensory devices can include, but are not limited to, optical sensors, an inertial measurement unit (IMU), a compass, an altimeter, a GPS module, a payload measurement module, a camera, a range sensor, and a thermometer.

For example, a proximity sensor (e.g., an infrared proximity sensor) can be configured to detect live sensory information relative to other USVs participating in the spatial performance and/or objects detected during execution of the spatial performance. The proximity information measure can be based on reflection signal strength or the infrared time-of-flight. The proximity sensor can provide supplementary information depicting distance between the two USVs, which can be used to keep even space between a swarm of USVs. The flight control firmware can use such sensor data for control loop.

In one or more embodiments, the USV swarm 200 can be configured to create an illusion of movement among the coordinated USVs. Rather than moving the USVs physically, the illusion of moving one or more objects can be achieved by placing multiple USVs along a trajectory path of the object being rendered. The USVs can then emit brief light (e.g., LED) output sequentially in the trajectory path to create the illusion of movement.

In one or more embodiments, a visual effect can be composed of the USVs maintaining a position in three-dimensional space, either docked or within close proximity to each other. For example, a rendering of a statue can be created in the sky composed of many USVs placed tightly together.

In one or more embodiments, sensory outputs of the USVs or of other sensory output devices on separate from the USVs can be coordinated to augment the spatial performance. For example, music or audio can be played from an external speaker and can be coordinated with LED lighting on one or more of the USVs in order to produce a synchronized audio-visual experience. For example, the music tempo can be synchronized to a set of blinking LED lights on a subset of the USVs. In another embodiment, one or more of the coordinated USVs can include speakers configured to produce audio output during the spatial performance.

In one example, these audio outputs can be oriented to produce a surround sound experience for spectators in the observation area 232.

In one or more embodiments of the invention, one or more of the coordinated USVs of the USV swarm 200 are configured to record audio and/or video of the spatial performance and/or the audience in the observation area 232. These recording USVs can be configured to stream the recordings to one or more web services and/or external clients. Thus, the recordings can be stored for later viewing/sharing or can be viewed directly over the Internet or other clients in realtime.

In one or more embodiments, live sensory information can indicate the presence of a problem or other issue that necessitates modification of the spatial performance, in accordance with predefined logic. The spatial control module 124 can be configured to identify a modified sequence of aerial maneuvers calculated based on the live sensory information from the sensory device 118, by determining that a live sensory event has occurred. Examples of the live sensory event include weather changes (e.g., rain, snow, high wind, etc.), failure of one or more USVs, and/or failure of one or more sensory output devices on one or more USVs. The spatial control module 124 can be configured to halt execution of the pre-determined sequence of aerial maneuvers in response to detecting the event, and to calculate modified instructions to mitigating or responding to the event. After calculating the modified instructions, the spatial control module 124 can be configured to execute the modified instructions and/or to communicate the modified instructions to other coordinated USVs, either directly or through an external device (e.g., the spatial coordination module 152).

Collision

In one or more embodiments, the USV 100 includes one or more motion processing units (MPUs, not shown), either embedded within one or more of the sensory devices 118 or separately operably connected to one or more sensory devices 118. The MPU(s) may be configured to obtain, detect, interpolate, coordinate, construe, and/or manipulate sensory data to derive sensory information about gestures, movement, position, environment, and etc. Thus, in one or more embodiments, an MPU may be able to interpret sensory information, derive sensory conclusions using that information, and to share those conclusions with the spatial control module 124.

In one or more embodiments, the spatial control module 124 includes functionality to receive collision data from the sensory devices 118 of the USV 100 or from proximal USVs participating in the spatial performance. Collision data can be shared between the coordinated USVs in a distributed manner using the USV communication modules 120 of the coordinated USVs. The collision data can include information about a collision event between one or more USVs or between a USV and an external object. Collision data can be used to modify the spatial performance, shorten or otherwise exclude content from the original plans for the spatial performance, communicate failures to an external administrator or to other USVs. For example, in the case of poor weather conditions such as wind, rain or snow, the minimum distance threshold between USVs can be increased and one or more segments of the spatial performance that require increased stability (e.g., docking) can be eliminated.

In one or more embodiments, the spatial control module 124 includes functionality to interpolate collision details about a docked USV structure using the collision data. Thus, one or more individual USVs can alter their individual operating plans based on the interpolated collision details. This can include USVs that were not involved in the collision. For example, if a USV experiences a failure, other USVs that are programmed to dock with the failed USV during the spatial performance can be instructed to skip a predefined docking operation in response to the failure.

In one example, other USVs can be informed about a USV experiencing partial (e.g., sensory) or total failure. These other USVs can be instructed to keep a larger minimum distance with the failed USV and may attempt to operate beyond that minimum distance while avoiding collision. If the surrounding USV could not determine an alternate operating plan by itself, it may enter one of the recovery methods discussed herein.

In the example of a quadcopter drone, the drone also may have an exoskeleton acting as a bump guard frame. The exoskeleton ensures that when the drones do collide with each other (or other objects) at relative low speed, the risk of their rotating blades hitting and damaging will be reduced or eliminated. When two drones collide with each other, even protected by the exoskeleton frame, shock may send a very strong reading to the drone's acceleration sensor. A spatial control module of the drone may detect the larger than normal reading and may determine that a collision has occurred. Continuing the example, the spatial control module of the drone determines the direction of the collision by reading the acceleration reading (e.g., while it is not saturated), or by comparing the current measuring coordination with the original coordination. The spatial control module then determines whether the readings or measurements are consistent with the internal flight control states.

In one or more embodiments, the spatial control module 124 tracks the USV's position, speed, and orientation using the sensory devices 118. The spatial control module 124 can detect unintended drift that is not consistent with the current speed and may make appropriate adjustment against the drift direction. The goal is to stay as close to the target track point as possible.

In the case when a USV drops out of the swarm or some other malfunction of the USV is detected, various recovery plans can be implemented, in accordance with various embodiments:

Recovery plan A: The spatial coordination module 152 may be able to detect the USV's position or USV's lack of response to the distance measure signal and may send a new operating plan to a standby USV to fill the position vacated by the malfunctioning USV.

Recovery plan B: The command center may send one or more updated operating plans to one or more USVs near the dropped out USV to fill its position. The next nearby USV may then maneuver to at least partially fill the position vacated by the malfunctioning USV. This method may have the advantage that no single USV needs to travel a very long distance.

Exoskeleton

In one or more embodiments, the exoskeleton 110 is a structure surrounding or at least partially surrounding one or more components of the USV 100. The exoskeleton can provide structural rigidity, weight balancing, aerodynamic properties, and a variety of other functions, in accordance with various embodiments. The exoskeleton can be constructed using or comprise a light-weight hollow material, mesh, a set of wires, bars, and can include both rigid and non-rigid parts that can allow for structural rigidity and/or pass-through of air or intake from the propulsion system 116. The exoskeleton can be mounted to other components of the USV at any number of locations. For example, in the case of a UAV having rotors for propulsion, the exoskeleton may be mounted to a rotor frame encircling one or more of the individual rotors. In one embodiment, no portion of the exoskeleton is located directly in a thrust path of the propulsion system 116, thus enabling unobstructed propulsion of the USV 100 using the propulsion system 116.

The shape of the exoskeleton can be any shape configurable to enable inclusion of the required components while maintaining aerodynamic or other properties needed for the USV to maneuver in three dimensions. For example, the exoskeleton can be a cube, rectangular box, circular cylinder, hexagonal cylinder, sphere, prism-capped cube or rectangular box, pyramid-capped cube or rectangular box, or cone-capped cube or rectangular box. Examples of USVs having various different exoskeleton shapes are illustrated in FIGS. 3A-3D, 4, 5A-5D, 6, and 7A-7B.

Latching Mechanism

In one or more embodiments, the exoskeleton includes the latching mechanism 120 configured to enable docking of one or more USVs with one another. For example, the exoskeleton can include at least one latching mechanism operable to facilitate an in-space docking operation with a proximate USV.

Figure 8A:
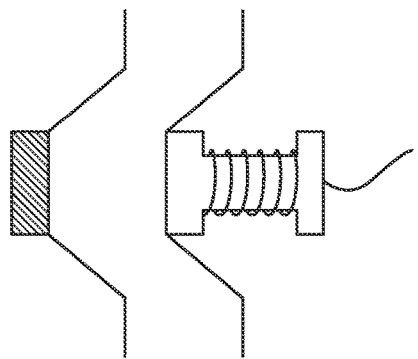
FIGS. 8A-8C show schematic diagrams of latching mechanisms, in accordance with one or more embodiments.
Figure 8B:
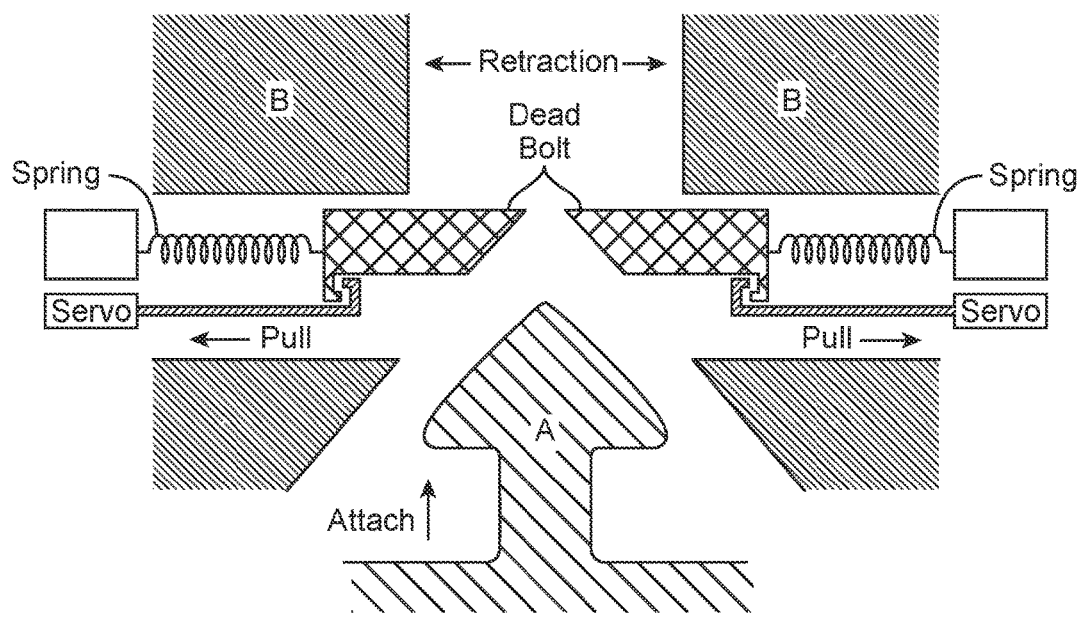
Figure 8C:
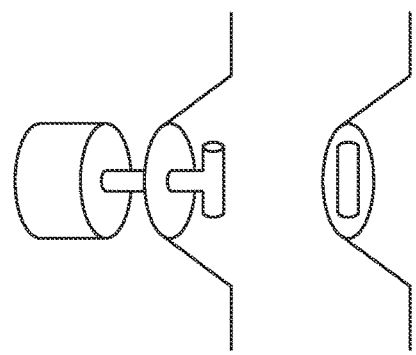

FIGS. 8A-8C depict examples of various latching mechanisms, in accordance with various embodiments of the invention.

Examples of the latching mechanism can include, but are not limited to: an electronic magnetic surface controlled by a microcontroller unit (MCU) on the exoskeleton, and a servo with mechanical locking control by an MCU. The mechanical locking control can sustain a relatively strong force.

In one or more embodiments, the latching mechanism includes at least one component of a charging device operable to couple with a charging device of another USV. In this manner, one or more USVs may transfer energy (e.g., "refuel") during the spatial performance. Special "recharge USVs" (not shown) may be deployed during one or more portions of a longer spatial performance in order to charge or refuel other USVs mid-flight. These recharge USVs can be structurally different from other coordinated USVs participating in the spatial performance. For example, the recharge USV may include a much larger power supply and/or high output battery charging device. Various forms of energy transfer can be used, in accordance with various embodiments. For example, while traditional electrical contacts connected through the latching mechanism may be practical and easy to implement, certain applications may require wireless energy transfer through close-proximity or magnetically aligned contacts. In this design, as shown in the illustration of FIG. 8A, the magnetic latch may be an electromagnetic lock including two major components: (i) A metal bracket or plate that may provide the surface for the magnet to attached on and (ii) an electromagnet that may have one or more loops of wire that conduct current through the wire to create a magnetic field. The loop of wire is also known as solenoid. The electromagnet may also have a ferromagnetic core such as cobalt, soft iron and silicon core. The core can enhance the strength of the magnetic force.

The USV may include one or more electromagnetic locks on each attached exterior surface. Because the USV may include more than one attached surface, each attached surface may be designed as unpolarized—there is no male or female distinction for the attached surface. One example of this design is the cube shape light pixel of FIGS. 1A-1C. For the horizontally attached surface, the electromagnetic lock may be installed on the upper and lower bumper guard.

Facing the attached surface, the upper bumper guard may, from left to right, include a bracket and solenoid. The lower bumper guard can include a solenoid and bracket such that when each surface attaches to a proximate USV horizontally, the solenoid may match the bracket for the horizontally attached surface. Similarly, the upper and lower attach can be configured to have the same symmetric design such that when the USV rotates to a different attached surface, the plate and solenoid still match.

In the example of FIG. 8A, the latching mechanism includes a guiding post for an electromagnetic lock. Because the USVs during operation might not have perfect alignment while attempting to dock, some mechanically guiding structure might guide the plate and solenoid to match each other. The guide includes a cone shape with solenoid at one end and matching depressed cone shape with bracket/plate at the other end. Once the two ends begin to approach one another to couple, the matching cone shape will adjust the USVs' orientation and position to align with each other. When the USV stops applying the current to the electromagnetic wire, without the magnet force, the two attaching surfaces may be allowed to break free and the USVs thereby unlock/decouple.

FIG. 8B depicts a latching mechanism including a deadbolt-style latching mechanism. The docking component may have dead bolt (or tang) similar to a door lock. When the USV docks and the lock is in position, the deadbolt may be triggered by a servo or a motor with gear to jam into the other part of the docking surface. Compared to the electromagnetic locking, which requires continuous current to produce a magnetic force, the deadbolt does not need to consume current to hold the two joining parts together once moved into the jamming position. In addition, the mechanical locking can sustain larger force than the electromagnetic locking as well. To unlock the deadbolt, the deadbolt may retract from the jamming position, causing the servo or motor to operate on the reverse direction. Without the deadbolt jamming, the two attaching surface may break free.

FIG. 8C depicts a latching mechanism including a T-style latching mechanism, instead of using a deadbolt that pushes out and jams into the other surface. The mechanical locking can use a rotating T-shape head entering a narrow opening. After the T-head enters the narrow opening, the motor or servo may rotate the T-head into locking position, preventing the T-head from retracting/removing from the opening in that position. The unlocking process may be just the reverse operation. The servo may turn the T-head in the opposite direction to the unlocking position. The T-head may be able to slide out from the narrow opening, thereby unlocking the two surfaces.

In one or more embodiments, the latching mechanism includes a dampening mechanism operable to dampen docking turbulence and/or collision effects.

In one or more embodiments, the exoskeleton 110 includes one or more dampening mechanisms. The dampening mechanism can be located between the exoskeleton and a frame of the USV 100. One or more dampening mechanisms can be incorporated into the latch, the exoskeleton, and/or the mounts of various components to the frame or chassis of the USV, in accordance with various embodiments of the invention. The dampening mechanism(s) can include one or more mechanical springs, hydraulic pistons, pneumatic pistons, magnetorheological damper, and/or any other type of shock absorber/damper capable of dampening impacts encountered by the USV. Other configurations are possible, in accordance with various embodiments. For example, in the case where the exoskeleton and frame are a single structure, the dampening mechanism can be placed between one or more latching mechanisms and the exoskeleton or can be incorporated into the latching mechanism. Thus, the dampening mechanism can be configured to dampen collision impacts and/or to increase the allowable tolerance for error in performing a latching operation using the latching mechanism.

One or more of the sensory devices 118, batteries or power supply 122, or other components of the USV 100 can be included in the exoskeleton according to various configurations. Weight balancing may require distribution of one or more components throughout the USV 100 exoskeleton and/or chassis (not shown). Sensory devices 118 may be better configured to detect peripheral sensory information when placed in the exoskeleton, enabling them to detect a wider sensory input range of periphery devices.

Optical Devices

In one or more embodiments, the exoskeleton includes one or more optical devices. The spatial control module 124 may be configured to receive instructions related to causing the optical devices 118 to emit light in coordination with the spatial performance to provide a visual display. Thus, the optical devices 118 can include a light source such as an LED, or other device. For example, each USV pixel can include red, green, and/or blue programmable light sources to emit any light color in the RGB color space. These optical devices 118 can operate similar to a high-definition television display pixel, but in this case, three-dimensional space. By operating the USVs next to each other in close proximity, the USV swarm 200 can render a three-dimensional object in space when viewed from the observation area 232. The three-dimensional object can appear to synchronously move (or can actually move) up, down, left, right, rotate horizontally (z), and/or rotate vertically (x, y) through the movement of the physical USVs and/or the optical outputs.

In one or more embodiments, any number of sensory device types can be included in the USV. Examples can include, but are not limited to, proximity sensors, inertial measurement units (IMUs), compasses, altimeters, GPS modules, payload measurement modules, timekeeping devices, cameras, range sensors, and thermometers.

In one or more embodiments, the exoskeleton 110 is coupled with a set of panels located at the lateral sides of the exoskeleton. Each panel includes a set of light sources configured to emit light in accordance with instructions of the spatial performance. The panels can be configured to pan and tilt in order to change the position and orientation of the sensory outputs (e.g., LED lights), modify the shape of a docked USV structure, and/or to change the position and orientation of sensory input devices.

In one or more embodiments, the propulsion system 116 is mounted on the exoskeleton in a manner that allows lateral or at least semi-lateral thrust. For example, the design of the exoskeleton can allow for motors, engines, or propellers of the USV 100 to be mounted in various positions and/or orientations that enable maneuverability of the USV 100. In this way, the USV 100 may be configured to operate with substantially little or no attitude. For purposes of this disclosure, attitude refers to the orientation of the USV 100 relative to the earth's horizon or some other fixed point of reference (i.e., relative degree of freedom). Lateral openings of the exoskeleton can be configured to allow for movement of air for thrust/intake, in accordance with various embodiments.

In one or more embodiments, the exoskeleton includes a set of mounts that are operable to connect one or more components of the USV to the exoskeleton, and/or to operate as a dampening mechanism separately or in conjunction with the latching mechanism. The mounts can include one or more connectors (e.g., screw, bolt, glue, and/or magnet) to affix components such as the propulsion system 116, sensory devices 118, and/or a frame of the USV 100 to the exoskeleton.

Exoskeleton Examples

FIGS. 3A-3D show examples of a UAV including a cube exoskeleton. This exoskeleton design can include twelve solid surfaces of a square cube, each surface including optical devices that can be controlled from the UAV spatial control module 124. Alternatively, the exoskeleton design can include four square or rectangular surfaces forming four perimeter walls (similar to a box without the top and bottom cover). This allows for airflow from the top and bottom without obstruction. In one embodiment, the perimeter surface can form a round circular wall instead of four rectangular surfaces. The solid surfaces of the UAV can be constructed from a semi-transparent material to allow for light to be emitted from one or more optical devices mounted inside of the exoskeleton (e.g., similar to a lantern). The surface can have small airflow passways to reduce air drag in windy environments.

Figure 3A:
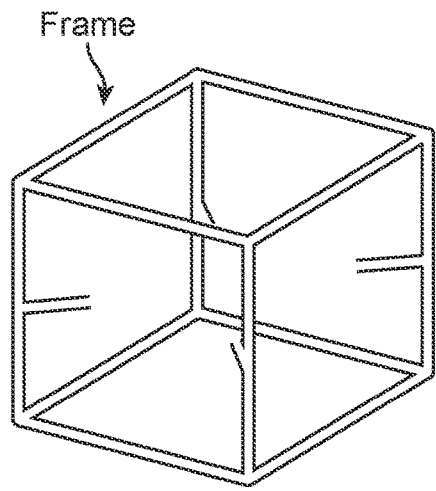
FIGS. 3A-3D, 4, 5A-5D, 6, and 7A-7B show diagrams of exemplary exoskeleton designs, in accordance with one or more embodiments.
Figure 3B:
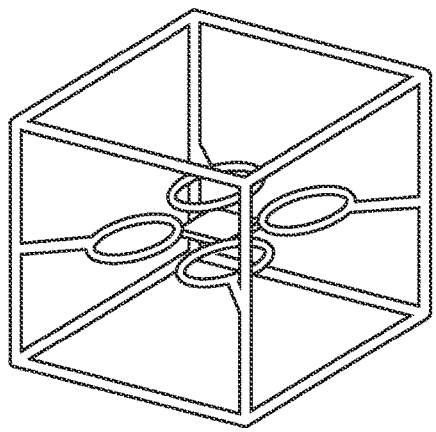
Figure 3C:
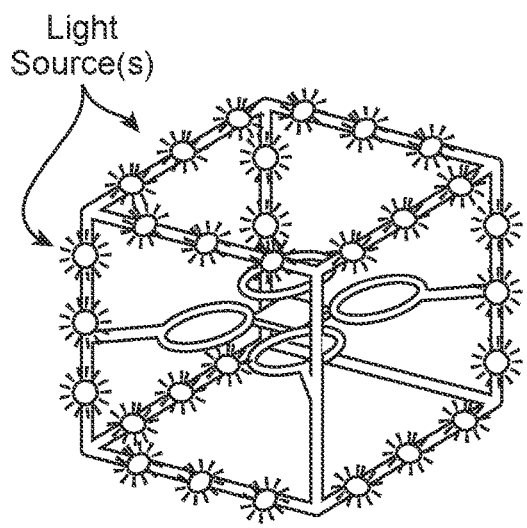
Figure 3D:
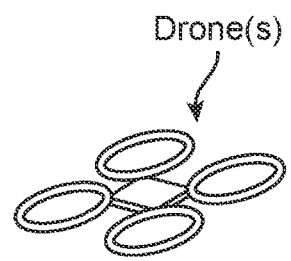
Figure 4:
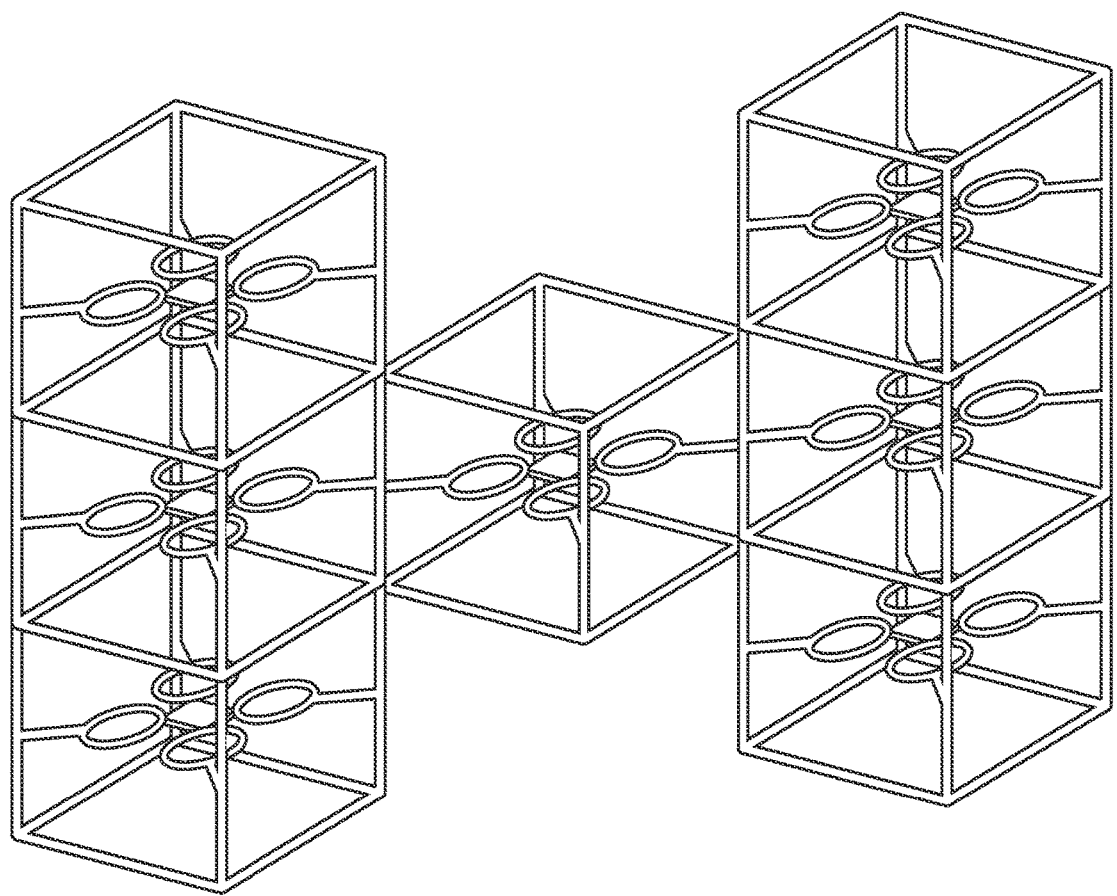

In the example of FIGS. 3A-3D, the exoskeleton includes a top opening and a bottom opening for pass-through of intake and thrust. The exoskeleton may have enough space to allow the airflow from the motor to discharge without obstruction. FIG. 4 includes a docked UAV structure comprising multiple cube UAVs (i.e., UAVs having a cube exoskeleton).

Figure 5A:
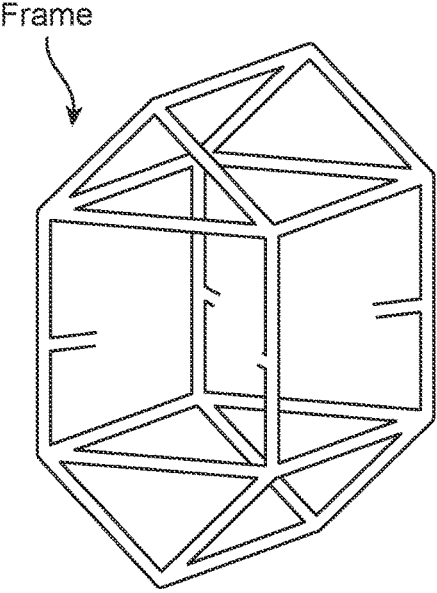
Figure 5B:
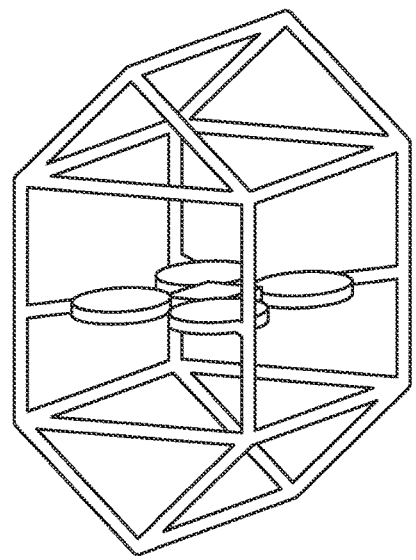
Figure 5C:
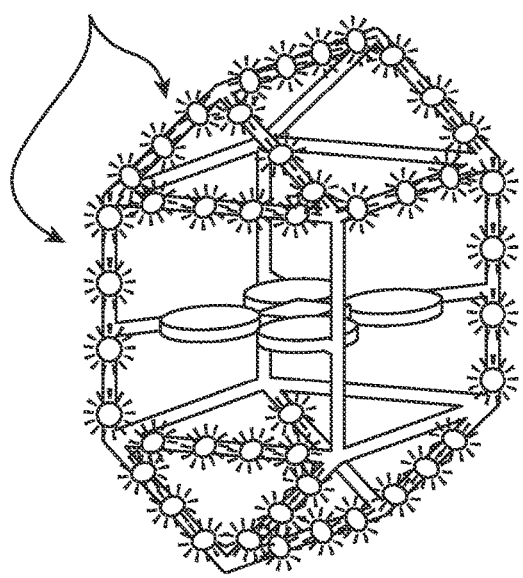
Figure 5D:
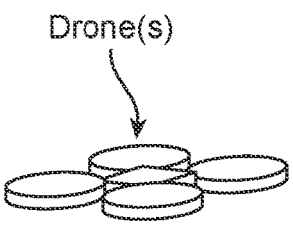
Figure 6:
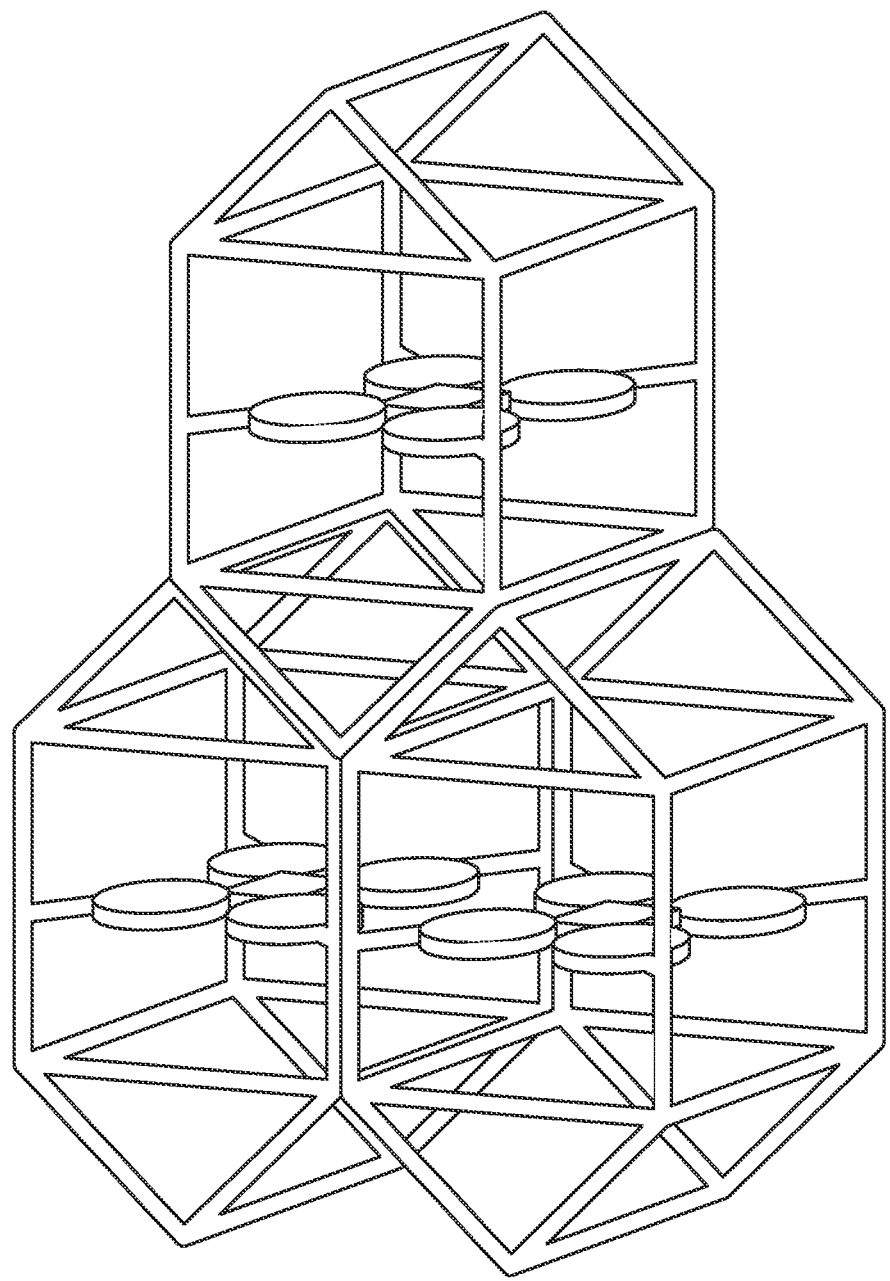

FIGS. 5A-5C and 6 show examples of UAVs having an exoskeleton that enables an alternative docking angle. In the example of FIGS. 5A-5C, the exoskeleton does not enable direct vertical docking and instead requires stacked UAVs to be horizontally staggered. FIG. 6 includes a docked UAV structure comprising multiple staggered UAVs in such a design. As shown in the example of FIG. 6, the exoskeleton design can minimize thrust and/or intake interference by preventing the UAVs from stacking directly. In other words, this design may have the advantage that thrust flows into the gap space between two lower level UAVs, avoiding the direct over the top air flow interference with a lower level UAV. FIG. 7B depicts a vertically stackable hexagonal exoskeleton design with optional exterior surfaces (e.g., 6 perimeter surfaces). FIGS. 3D and 5D depict examples of a quadcopter UAV design having four rotary propulsion devices. The quadcopter is one among many configurations that can be utilized with one or more of the exoskeleton designs, in accordance with the depicted figures (e.g., 3A-3C, 5A-5C) and various embodiments of the invention.

Figure 7A:
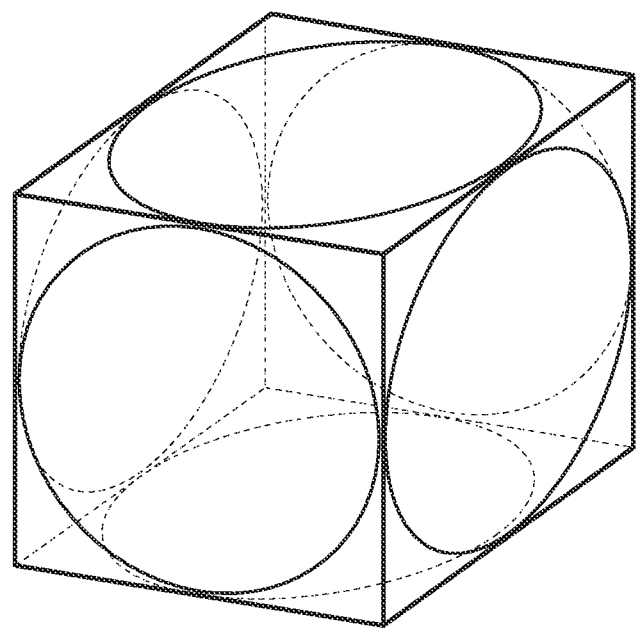
Figure 7B:
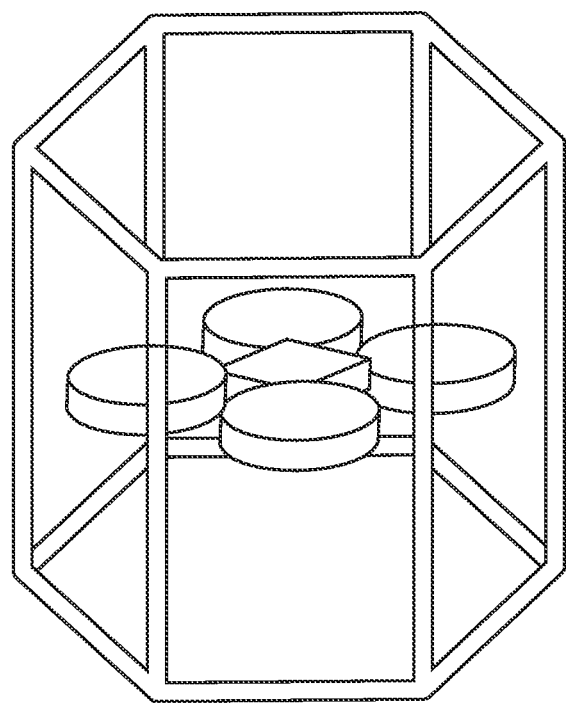

FIG. 7A shows an example of a cube-shaped UAV having an exoskeleton that enables multi-directional low-attitude flight using rotors positioned on each exterior surface of the cube. In the example of FIG. 7A, the angles of the rotors allow for a more extreme horizontal thrust capacity without the necessity for tilting the angle of the UAV in flight. Low attitude flight by the individual UAVs can be helpful in facilitating complex docking operations by enabling fine motor controls to occur in lateral motion.

In the aforementioned and other embodiments, the exoskeleton may be stackable, allowing UAVs to land on top of each other. Also, the charging ports on the frame may be configured to link together as UAVs land on top of each other. In this way, UAVs may not need to be individually charged, e.g., batteries or power supplies 122 may be chained together and charged from a single UAV on the top or in the chain.

Docking

In one or more embodiments, the spatial control module 124 includes functionality to execute, during the spatial performance and using the latching mechanism 120, the docking operation causing the USV 100 to dock with one or more USVs to form a docked USV structure. The docking operation can include positioning the USVs near one another and utilizing auxiliary propulsion devices of the USV in order to execute precise lateral movements required for docking. Thus, modifying the individual operating mode can further include enabling at least one ancillary propulsion device configured to enable the docked USV structure to operate with less variation in attitude.

In one or more embodiments, the spatial control module 124 includes functionality to, after formation of the docked USV structure, modify an individual operating mode of one or more individual USVs to enable the docked USV structure to operate with less variation in attitude than the USV 100 prior to docking. Each operating mode can refer to a set of parameters defining thresholds for attitude, acceleration, velocity, thrust, and anything else impacting the movement of the USV. The operating modes can also differ in terms of activation/usage of sensory devices. For example, when operating in docked operating mode, the USV may de-activate or not utilize sensors located in locations that are interior to the docked structure such that only periphery sensors are active or used. In individual operating mode, all sensors may be active or utilized. Similarly, sensory output devices located on the interior of the docked structure, such as lights and speakers, may not be utilized during docked operating mode. Thus, modifying the individual operating mode can include disabling one or more non-peripheral sensory devices, wherein at least one peripheral sensory device of the docked USV structure remains enabled.

In one or more embodiments, the spatial control module 124 of each USV is configured to receive either (i) the same instructions given to other USVs or (ii) a different set of instructions from other USVs executing the spatial performance. In other words, the instructions given to each USV can either be specific to that USV, or can include a master set of instructions for multiple USVs. In the example of a master instruction set, it may be possible to propagate the instructions in a distributed manner (although a distributed communication protocol may also be used for individual instruction sets in certain circumstances).

In-space (e.g., mid-flight) docking can be a complex process. To properly dock, the USV may need to know the distance, orientation, and/or velocity of one or more proximate USVs. While the USV may be informed about such information via the positioning system 114, the information might not be sufficiently accurate. In one embodiment, the USV can use one or more onboard cameras to assist in the docking operation, as described herein. During the docking operation, the USV may need to be able to move horizontally. For example, although many rotor-propelled USVs would tilt during horizontal flight, multiple mechanisms are described herein to reduce or eliminate tilt during horizontal flight.

Camera-Assisted Docking

In one or more embodiments, one or more surfaces, edges or other areas of the USV include an identifier that is readable by other USVs to identify the USV and/or its orientation in space. For example, a QR code-like marking such as an Aruco Marker can be used. The identifier may be a physical identifier or may be readable by a specialized device, such as a radio-frequency identification (RFID) tag, a near-field communication (NFC) device, a Bluetooth device, or some other mechanism for communicating the location and/or orientation of one USV to another USV. Using a barcode-like scanner (e.g., a one-dimensional sensor array) can locate distance and offset. This mechanism is similar to a camera sensor but uses only one dimension. In the example of a physical identifier, since the marking may have a predetermined size and shape, the USV can be configured to identify distance and direction by scanning the code. In another example, the USV can use one or more flashing lights instead of the static marking. In this way, it may be possible to filter out background interference by using color or light in a specific wavelength. Alternatively, Sonar or Lidar devices can be utilized to project a beam of energy to detect or scan the object shape.

Fight Control Physics

An in-depth example of the flight control physics that may be used to model the operation of USVs utilizing multiple rotating blades for propulsion is discussed herein.

Beginning the example, each blade (of a total number of blades 'n') has a controllable throttle power, which can be represented as Pn. Each blade produces a two-force effect on the vehicle. One force is the thrust force it produces, which can be called $T(Pn)$. The other force is the rotational torque the blade produces, which can be called $R(Pn)$. $T(Pn)$ will be a function of time as well, because the rotor speeds up and slows down over time. For simplicity, the time variable can be ignored in the model and instead assumed that the blade reaches a final constant speed at given power Pn. The combined thrust of 'n' blades is thus expressed as $Tc=T(P1)+T(P2)+\ldots+T(Pn)$ and the combined rotational torque is $Rc=R(P1)+R(P2)+\ldots+R(Pn)$.

In order to have the vehicle hover in a fixed location in space (not moving), Tc will be produced such that Tc+Gravity=0 is satisfied.

Gravity is produced by the earth. In a 3D space, the equation can be written in each of the three dimensions as follows:

$$Tcx+Gx=0$$

$$Tcy+Gy=0$$

$$Tcz+Gz=0$$

When setting the ground as a reference point, Gx=0 and Gy=0. Matrix representation can be used to express each force in a three-dimensional vector still expressing Tc+G=0 such that Tc and G are three-dimensional vectors including [x, y, z]. Similarly, if we want the USV to stay in the air without rotating, we will have the formula Rc=0. Rc can be expressed as a three-dimensional vector as well.

Reducing or Eliminating Spatial Attitude

Sometimes USVs may need to change attitude (angle) in order to maneuver to a different direction. This may be because the propulsion device (e.g., a rotor blade) produces thrust towards only one direction (e.g., vertical to a blade's rotation circle).

In order to move horizontally, the USV may need to first change the attitude (angle) (i.e., tilt the propulsion device towards the direction it needs to move such that the thrust has at least a partially horizontal projection).

To maneuver towards any direction without changing the vehicle attitude, we have an independent controllable thrust point to each dimension in space, e.g., x, y, z. Three independently controllable variables, Tx, Ty, and Tz, combined together can generate a thrust vector pointing towards any direction in space, without changing the attitude (angle) of the vehicle. The vehicle may also be configured to rotate towards any direction. In this case, rotational vectors Rx, Ry, and Rz are also independently controllable. Altogether, in one embodiment, there may be 6 independent controllable variables. One possible design with 6 blades is depicted by the example of FIG. 7A.

Another example of such a design is a cube with six blades oriented in places of each of the surfaces of the cube. In this example, opposing blades can be configured to rotate at different directions, each having an independently controllable variable Bx1, Bx2. To generate the desired Tx, we have $T(Bx1)+T(Bx2)=Tx$. To generate the desired Rx, we have $R(Bx1)+R(Bx2)=Rx$. Function $T(x)$ may be the thrust output of a given throttle x. $T(x)$ may increase as x increases. Function $R(x)$ may be the rotational torque of a given throttle x. $R(x)$ always increases as x increases. So, given two independent variables Bx1 and Bx2 with two almost linear equations, it will have at most one solution. (No solution exists such that the Tx or Rx is not reachable.)

The example above has blades configured for simple illustration. This is not required. Other designs may work when 6 independent variables satisfy the 3 thrust equations and/or the 3 rotation equations.

Docking Flight Control

In this disclosure, one term for a group of docked UAVs is a UAV-set (before any docking, every UAV can be referred to as its own UAV-set). When two UAV-sets dock with each other, a new UAV-set is formed. The physics for flying an individual UAV is different from multiple connected UAVs, so a different flight control algorithm may be implemented.

In one embodiment, the flight plans are precomputed such that it is possible to control the order in which UAVs dock with each other. For purposes of this disclosure, the term "flight plan" can refer to an operating plan of a UAV. At any moment in time, the structure of each UAV-set may be known as well as which UAV-sets will be imminently docked.

To fly a UAV-set, it is possible to control the rotors on each individual UAV. Because the structure of all possible UAV-sets may be known ahead of time it is possible to simulate the physical structure of each UAV set and precompute the effect of operating each propulsion device (e.g., rotor) for each UAV in the set. More specifically, $T(Pn)$ and $R(Pn)$. Pn is the throttle power of blade n, $T(n)$ is the thrust generated by thrust power n, and $R(n)$ is the rotation torque generated by thrust power Pn. In one embodiment, each UAV stores instructions depicting (e.g., $T(Pn)$ and $R(pn)$) how to fly each UAV-set it is in.

In general, in one embodiment, when UAV-sets dock to form a large structure, the algorithm may include a restriction to only dock UAV-sets of similar size. This limitation can be defined as a threshold number or percentage of UAVs in which the UAV-sets differ. Thus, in this embodiment, each docking step may roughly double the size of each UAV-set. In this way, each UAV may only be in roughly log(n) distinct UAV Set (where n is the total number of UAVs) and there may only be roughly log(n) docking steps to complete the final structure.

In one or more embodiments, the USV 100 includes functionality to carry a small amount of payload. This could be another LED light, or material for special effects such as dry ice. Since the payload for each UAV is pre-determined, it is possible to pre-compute the flight knowledge of the USV 100 with payload just like the method for UAV-sets, above.

Multi-Phase Docking

In one or more embodiments, the coordinated USVs 210-224 of the USV swarm 200 are configured to perform a multi-phase docking operation. A multi-phase docking operation can involve any number of concurrent or sequential docking operations performed by different subsets of the USV swarm 200. For example, multi-phase operations can be utilized in situations where the required axis of movement differs between two different operations, both of which are necessary to create a docked USV structure. In this example separating these operations into separate sequential phases reduces the complexity of forming the docked structure and allows for a higher tolerance for error in performing the docking. In other examples, the orientation of latching may require a first subset of the coordinated USVs to be docked into place before a second subset of the coordinated USVs can complete docking.

In one or more embodiments, the spatial control module 124 of at least a subset of the USV swarm 200 includes functionality to execute, during the spatial performance and using the latching mechanism 120, multiple sequential docking operations (i.e., a multi-phase docking operation) to form a docked USV structure.

Docked Operating Mode

In one or more embodiments, the spatial control modules 124 of at least a subset of USVs among a docked USV structure include functionality to cause the docked USV structure to enter a docked operating mode. Docked operating mode may involve the docked USV structure operating with less variation in attitude, for example.

In one or more embodiments, docked operating mode can involve deactivating sensors and propulsion devices of a subset of the coordinated USVs after forming the docked USV structure and using sensors and propulsion devices of a remainder of the coordinated USVs to cause the docked USV structure to perform docked movements (e.g., aerial maneuvers).

In one or more embodiments, during docked operating mode operation, the individual USVs of the docked USV structure can be configured to select a master spatial control module. Any method can be used for selecting the master controller, including the following examples:

(i) the master controller can be pre-selected prior to executing the spatial performance (ii) a pseudo-random method can be used with a fixed input (e.g., unique numeric identifiers of the USVs)

(iii) a predefined selection criterion that always results in selection of a single master controller. For example, calculating the USV closest to the centermost point of the docked USV structure In the case of a master spatial control module, a single CPU and/or MCU may perform collection of the sensory inputs, calculation of the control output, and sending actuator output (e.g. motor throttle). In this case, there may be more than one CPU, even though each CPU can have data communication with other CPUs using electronic data bus (spi, uart) or wireless communication. However, the price of this centralized controller logic may be an increase in latency. In other words, there may be a time delay in collecting data from different USVs and sending actuator output to different USVs from a single master controller.

Alternatively, in one or more embodiments, the individual USVs of the docked USV structure can collaborate to operate the structure while docked. A predefined protocol for delegating responsibilities of the docked structure can be used. In one example, each USV of the docked structure includes a complete set of instructions for the spatial performance of the docked structure. Thus, each individual USV can perform at least a portion of those instructions depending on its role and position in the docked structure.

Responding to collision or realtime sensory data can be more complicated in the docked structure, especially if the controller logic is not centralized in a master controller. In the distributed case, the individual USVs can propagate the sensory information to other USVs in the docked structure such that each USV can respond independently to the sensory data and the behavior of the other USVs in realtime.

In the master controller case, all sensor data can be collected by the master controller from different USVs into one CPU, and processed to generate the control output. Then the control output can be sent to different USV actuators. Due to the latency problem, latency may add up very quick when the number of USVs increases, which may result in control problems. More latency means slower response to disturbance, and lower control bandwidth.

In one or more embodiments, a hybrid approach is utilized to execute the controller logic. Each IMU sensor (acceleration, gyro and magnetic, air pressure etc.) on one or more USVs of the docked structure may have very similar data, because such USVs are mechanically connected together, forming a solid structure. So, the spatial control module of each USV may know how the structure is formed and how each individual propulsion device (e.g., motor and blade) will contribute to the whole structure's movement. The individual USV's spatial control module may use the local sensor data as input to compute the local actuator output. This provides a faster path from receiving the local sensor data to the local control output and may make up the high control bandwidth part of the control signal. At the same time, each USV may provide the sensor data to be used for determining how the docked USV structure moves. The master controller can use each node's (each USV) data to recalculate the control output on each node and to determine how the whole system is performing. The master controller unit may then provide adjustment instructions to different USV nodes depicting how much control gain it should have. That may impact the lower bandwidth part of the control signal.

In one or more embodiments, the spatial control modules 124 of the docked USVs perform an undocking operation involving unlatching the individual USVs using the latching mechanisms. Upon unlatching, control firmware of one or more of the USVs can exit docked operating mode and enter individual operating mode in order to control their individual positions. For example, in individual operating mode, each USV has full control of its own blades. Two USVs may then execute operations to move apart from each other in order to complete the undocking process. Each USV may detect the separation using one or more onboard sensors such as IMU, sonar, image sensor(s), and capacitive sensor(s).

An in-depth example of the flight control physics that may be used to model the operation of a docked USV structure is discussed herein.

In this example, we analyze two quadcopter UAVs, hereinafter UAV A and UAV B, each having four blades, represented by the coefficient [1-4]. The combined thrust of 'n' blades is thus expressed as $Tc=T(P1)+T(P2)+ \ldots +T(Pn)$ and the combined rotational torque is expressed as $Rc=R(P1)+R(P2)+ \ldots +R(Pn)$.

Before the docking, the two UAVs, while hovering at a fixed point in space, are represented as:

$$TcA+Ga=0$$

$$Tcb+Gb=0$$

We can further expand that representation into three dimensional space at the x,y,z projections as follows:

$$Tcx+Gx=0$$

$$Tcy+Gy=0$$

$$Tcz+Gz=0$$

Thus, UAV A is represented as follows:

$$TcAx1+TcAx2+TcAx3+TcAx4+GAx=0 \quad 1)$$

$$TcAy1+TcAy2+TcAy3+TcAy4+GAy=0 \quad 2)$$

$$TcAz1+TcAz2+TcAz3+TcAz4+GAz=0 \quad 3)$$

Similarly, UAV B is represented as follows:

$$TcBx1+TcBx2+TcBx3+TcBx4+GBx=0 \quad 1)$$

$$TcBy1+TcBy2+TcBy3+TcBy4+GBy=0 \quad 2)$$

$$TcBz1+TcBz2+TcBz3+TcBz4+GBz=0 \quad 3)$$

After completing the docking operation, the docked UAV structure (A+B) is represented as a single structure, as follows:

$$TcAx1+TcAx2+TcAx3+TcAx4+GAx+TcBx1+TcBx2+\\TcBx3+TcBx4+GBx=0$$

$$TcAy1+TcAy2+TcAy3+TcAy4+GAy+TcBy1+TcBy2+\\TcBy3+TcBy4+GBy=0$$

$$TcAz1+TcAz2+TcAz3+TcAz4+GAz+TcBz1+TcBz2+\\TcBz3+TcBz4+GBz=0$$

This representation leaves us with the same number of variables and less formulas. Thus, mathematically, there are a greater number of solutions to the equations. Not all of these solutions are optimal, efficient, or practical for real-world operation. For example, in the scenario where UAV A is stacked on top of UAV B, one solution to the equations represents UAV B producing twice it's pre-docking thrust to maintain hover, while UAV A produces zero thrust. In other words, this solution models the scenario where UAV B carries all of the load. Another valid yet suboptimal solution to the equations involves UAV A providing reverse thrust push against B (to be counter productive), and UAV B more than double it's pre-docking thrust to maintain hover while countering UAV A's thrust. Both of these examples represent valid solutions to the formulas.

As a result, in one or more embodiments, constraints are selected to reduce or eliminate the number of suboptimal, undesired, and/or counter-productive solutions. For example, one set of constraints may require the solution to have battery efficiency that exceeds a selected threshold. This may involve selecting solutions that minimize performance time of the UAVs and/or other factors that affect battery efficiency. In another example of optimizing for battery consumption, each UAV outputs power at the same rate while docked such that battery consumption curve of each UAV is identical during docked operation. Thus, in one embodiment, modeling with the addition of constraints is an optimization problem.

Another difference to account for in docked operating mode is the center of gravity of the docked UAV structure. While UAV A is in individual operating mode, its center of gravity is located at a point inside UAV A. Upon docking with UAV B, the center of gravity of the docked UAV structure (A+B) can change to a point between UAV A and UAV B, for example. This change in the center of gravity will affect the torque formula. Torque can be expressed as follows:

$$T=F \times d,$$

where F is force and d is the perpendicular distance of force from the axis of rotation.

Interference

Operating UAVs in the stacked position during terrestrial flight may produce challenges. For example, the UAVs flying horizontally next to each other may not produce significant interference to each other, because most of their thrust is directed downwards. Even minor collisions may not be enough to alter their individual flight paths. However, in this example, stacking UAVs in the vertical direction may provide a challenge due to the upper UAV producing thrust towards the lower UAV. The lower UAV may suffer from the downdraft and gain less lift. Thus, it may be harder to control for the lower USV's position and to perform one or more maneuvers by the lower USV.

In one or more embodiments, the UAVs are operated in the stacked position while minimizing or eliminating interference. One approach is to utilize the audience's viewing angle to position the UAVs such that the UAVs appear to be closer together than they actually are. This can be done by staggering the UAV positions by increasing or decreasing their distance in the direction directly closer or farther away from the observation area 232 of FIG. 2. By staggering UAVs, the appearance of "stacking" the UAVs vertically without actually doing so may be produced. At longer distances the variation in positions along this axis may produce minimum impact in the appearance of the flight performance.

In one or more embodiments, the effect of interference may be avoided or minimized by docking the USVs to form a solid structure. The spatial control logic of a single docked structure may be easier to implement than two or more loosely coupled USVs because the interaction may be much more predictable. If two USVs stacked together can provide enough thrust for lifting two USVs upward, the docked USV may be able to operate (per the description of docked spatial operation in this disclosure).

In one or more embodiments, it may be possible to avoid or minimize the effect of interference by affixing the propulsion systems 116 of the USVs at a higher position in the frame or body of the USV. In this way, the body of the upper USV may provide enough vertical pathway to minimize the impact of the thrust to the lower USV. In one embodiment, the same effect can be achieved by adding an extendable panel to increase the vertical height of the USV and to provide a longer pathway for thrust exhaust. The extendable panel may further be utilized to cover the gap between the upper and lower level of the USV.

Landing

In one or more embodiments, the spatial control module 124 includes functionality to execute a landing operation. The landing operation may result in individual and/or docked USV structures landing in the landing/takeoff area 236 in a predefined sequence, orientation, and/or location. Thus, the spatial control module 124 executes the landing operation while one or more of the coordinated USVs are docked. In this way, the spatial control module 124 can be configured to cause the docked USV structure to land upon completion of the spatial performance. For purposes of this disclosure, "landing" can refer to maneuvering a USV to a final position upon completion of the spatial performance, and does not necessarily refer only to an aerial performance involving a set of UAVs. Other embodiments involving USVs in three-dimensional space can also involve "landing." The landing position of each USV can be measured by the positioning system 114 using an acceleration sensor and/or an RF location system.

In one or more embodiments, individual USVs can be configured to land on top of one another, either in a docked or undocked configuration.

Realtime Response

In one or more embodiments, the spatial control module 124 includes functionality to receive information about a deviation from the spatial performance (e.g., flight plan). The spatial control module 124 may then calculate a response to the deviation and may communicate information about the deviation to an external spatial coordination module 152 and/or to other USVs participating in the spatial performance. The information about the deviation can be determined based on realtime data from one or more of the sensory devices 118 and may be calculated by interpolating details about multiple sensory detections. The spatial control module 124 may use the information about the deviation and the live sensory information from the sensory device(s) 118 to calculate a modified sequence of spatial maneuvers. Examples can include, but are not limited to, detecting a failure of a proximal USV and filling a spatial void caused by the absence of the failed USV, detecting rain or snow and increasing the spatial threshold between adjacent optical outputs to increase visibility of a visual rendering, detecting wind measurements beyond a predefined threshold and increasing the minimum distance between proximal USVs in order to reduce the likelihood and severity of collisions, and detecting a sensory input/output failure on a USV and modifying the position and/or orientation of one or more proximal USVs in order to mitigate for absence of the sensor in a particular location.

In one or more embodiments, the spatial control module 124 includes functionality to transmit a notification of the modified sequence of aerial maneuvers to an external spatial coordination module 152 and/or to other USVs participating in the spatial performance. The notification can be transmitted via distributed or direct wireless communication between the entities.

In one or more embodiments, the spatial control module 124 includes functionality to determine that one or more USVs cannot continue participating in the spatial performance. This determination can be made in response to determining that the USV is unresponsive, has communicated information about a failure, via visual confirmation by a human operator, sensory information from a proximal USV, and/or any other means of determining failure among the USVs. The spatial control module 124 of the failed USV and/or one or more proximal USVs can then request replacement of the USV in execution of the spatial performance. In one or more embodiments, the spatial coordination module 152 can detect the failure and transmit a request to a standby USV to replace the failed USV.

In one or more embodiments, the spatial control module 124 of each USV includes functionality to independently detect a failure in executing a portion of the spatial performance. In one embodiment, the spatial control module 124 can be configured to communicate the failure to the spatial coordination module 152, or if no spatial coordination module is present, failure information can be communicated in a distributed manner with other proximal USVs participating in the spatial performance. In this way, it is possible to propagate distributed communication of the failure, by one or more of the coordinated USVs, to a remainder of the set of coordinated USVs. In one or more embodiments, other USVs can calculate and execute modifications to the spatial performance based on receiving distributed communication of the failure.

For example, a first UAV may expect to detect a second UAV at a particular flight path waypoint during a flight performance. In this way, the second UAV's presence at the flight path waypoint serves as validation control ensuring that the flight performance is progressing according to plan. Upon detecting an absence of the second UAV at the waypoint, the first UAV may execute a mitigation plan based on specific information about the absent UAV, and/or the first UAV may communicate information about the failure to an external spatial coordination module 152.

Positioning System & Guidance System

In one or more embodiments, the positioning system 114 is a device configured to determine and provide location information about the USV 100. For example, the positioning system 114 may be a global positioning system (GPS) receiver configured to obtain location coordinates of the USV 100 from an external satellite or server source. The positioning system 114 can use GPS, DGPS, RTLS measure its coordination position. While a standalone GPS receiver may provide more limited accuracy, the positioning system 114 can be configured to receive differential GPS signal from a ground GPS station in order to achieve better accuracy.

As an alternative to a DGPS signal, the USV can use a wireless transceiver that provides real time location system (RTLS) data. The form of RTLS ranging may involve two wireless transceivers, such that the range may be measured by determining the time in which a wireless signal travels between the two modules. The measurement can then be utilized by the positioning system 114 to determine the distance between two RTLS transceivers. In another example, a more complicated RTLS implementation utilizes fixed infrastructure. In this system, anchors may be used as transceiver modules with known locations. The USV may carry a wireless transceiver as a tag. The tag can be the transceiver module moving in the space covered by the anchors. By measuring the range between the anchor(s), the USV can calculate the internal position relative to the anchors. Because the anchor position is already known, the USV can know its position in the space. The USV may use elapsed time to determine the current target tracking point coordination in the three-dimensional space.

In one or more embodiments, the guidance system 112 is a device implementing a guidance process used for controlling the movement of the USV 100 and determining its level of compliance with the spatial path. The guidance system 112 may be utilized by the spatial control module 124 in conjunction with the positioning system 114, sensory devices 118, and the propulsion system 116 to maneuver the USV in accordance with the operating plan instructions.

In one or more embodiments, the guidance system 112 includes functionality to determine that the USV 100 has departed from a predefined threshold distance or time of the spatial path using a spatial navigation mechanism. The guidance system 112 can be configured to provide instructions for returning to the spatial path. The spatial path may be defined using any number of discrete waypoints and/or paths defining relative positions in three-dimensional space. Any spatial navigation mechanism can be used to define the waypoints, paths, and/or thresholds, in accordance with various embodiments.

In one or more embodiments, the guidance system 112 includes functionality to use the current coordination of the USV (from DGPS or RTLS) to guide the USV following a target tracking point. The guidance system 112 may utilize a control process tracking a moving target point defined by the operating plan. The USV can move up, down, left, right, yaw, roll, pitch, speed up, and/or slow down according to the relative position of the target track point. For example, if the USV is behind the target track point, the USV can speed up towards the target track point direction.

In one embodiment, the current coordination of the USV may not need to be communicated to other USVs. Instead the USV can calculate the error between the current coordination and the target tracking point. If the distance is within a given threshold (tolerance), the USV may be in good condition. If all USVs are within the threshold, then they may not need to take further precautions to avoid colliding with other USVs.

The operating plan calculation process may ensure that at each elapsed time unit, each target track point includes enough tolerance so that even if the USV is off the target track point within the tolerance, it will not collide. In the case of a USV deviating from the target track point by exceeding the threshold tolerance, the deviated USV may communicate to one or more other USVs that it is in an abnormal position. Thus, proximal USVs may take measures to mitigate for the deviation, in one embodiment.

External Coordination

In one or more embodiments, the spatial coordination module 152 includes functionality to receive, during the spatial performance, live sensory information from sensory devices of one or more of the coordinated USVs. The live sensory information may be relative to any object or subset of the coordinated USVs participating in the spatial performance that are in proximity to the sensory devices.

In one or more embodiments, the spatial coordination module 152 includes functionality to perform realtime modification of the spatial path(s) of one or more USVs or other aspects of the spatial performance in response to the sensory information. The spatial coordination module 152 may detect a deviation from the spatial performance and attempt to correct the deviation by transmitting modification data to at least a subset of the coordinated USVs.

In one example, the spatial coordination module 152 is configured to shorten the spatial performance in response to user input or external stimuli (e.g., the sensory information). In this example, the spatial paths of the USVs may be truncated in a manner to prevent collision or other unintended consequences. The spatial coordination module 152 includes data indicating that one or more segments of the spatial performance require a predefined minimum number of functioning USVs and/or sensory outputs in order to be executed optimally. This information can be predefined by a designer of the spatial performance. During the performance, as realtime feedback is received, the sensory and other data are analyzed to determine if it is still possible to execute each segment of the spatial performance optimally (e.g., whether the predefined minimum number of functioning USVs and/or sensory output devices are operational). If it is determined that the predefined minimum threshold is exceeded (e.g., that there are not enough USVs or sensory devices to optimally execute the segment), the spatial coordination module 152 begins a mitigation routine.

Continuing the example, during the mitigation routine, the spatial coordination module 152 determines how to eliminate the segments from the spatial performance and, if possible without causing noticeable interruption, truncates operating paths/routines of the remaining USVs and sensory devices to eliminate segment(s).

In one or more embodiments, the spatial coordination module 152 includes functionality to calculate a modified sequence of aerial maneuvers based on the live sensory information. The modified sequence of aerial maneuvers may include eliminating or modifying segments of the spatial performance in response to sensory information, weather conditions, and other types of stimuli.

In one or more embodiments, the spatial coordination module 152 includes functionality to transmit the modified sequence of spatial maneuvers to only a subset of the coordinated USVs.

Distributed Logic

In various embodiments of the invention, and for purposes of this disclosure, the business logic defined with respect to the spatial control module 124 and the spatial coordination module 152 can be shared or implemented in either module. Thus, while the functionality of each module is described separately for illustrative purposes, these two modules can be configured to perform similar or identical functionality, depending on the desired architecture. In a distributed communication architecture, there may be no spatial coordination module 152 whatsoever. In this case, the individual spatial control modules of the USVs may be either executing a predefined scripted spatial performance with no realtime modification, or may be configured to individually determine modifications to their operating plans and to "decide" on modifications to the spatial performance using distributed communication and one or more predefined algorithms for distributed controller logic.

The following describes various examples of systems for distributed logic allowing USVs to communicate in-flight without the use of an external controller.

In one example, each of the USVs can have a unique identifier (e.g., a MAC address or device address on the network interface). In one or more radio frequency (RF) embodiments, the unique identifier can be an address code, PN code, IP address, or some combination thereof. Broadcasting in the RF or network embodiments may not scale with a large number of USVs, or may not be feasible due to range limitations. Thus, the USV swarm may be divided into proximal groups. In one example, each group uses a different channel or frequency to communicate, similar to subnets in an IP network. Each group of USVs may have a group leader, which acts like a network gateway. The group members each send a status packet to the group leader, and the group leader aggregates all the local group information into a bigger packet and forwards the aggregated information to the group leader of a proximal group. That group leader then adds its own group's aggregated information to the packet, and passes on to next group's leader until one group leader finally receives aggregated information of all USVs in the swarm.

The full information may then propagate backwards from group leader to group leader, concurrently, and thereafter from group leader to group members. Once a USV gets the aggregated full sensor information, it can use that information to make corrections to the control output. Furthermore, in one or more embodiments, the USV can identify correlation(s) of the relationship between correction(s) and the local sensor input(s). If the identified correlations exceed a predefined threshold, the USV can be configured to make adjustment to the local spatial control module to include that correlation as part of the model prediction. This may result in future control outputs requiring less correction and thus faster local response.

In one embodiment, the system can be extended to have multiple levels of group leaders per group. Thus, a hierarchy of group leaders and subgroup leaders form connections that can be represented by a binary tree having Log(n) levels of groups.

The following are just a few examples of spatial control module 124 functionalities that can be included, either partially or entirely, in the spatial coordination module 152:

(i) functionality to define instructions for operating the sensory devices 118 of the USV 100

(ii) functionality to determine that one or more of the coordinated USVs cannot continue participating in execution of the spatial performance, and to cause one or more additional USVs to replace them in execution of the spatial performance (iii) functionality to determine that one or more of the coordinated USVs cannot continue participating in execution of the spatial performance, and to cause a subset of the other coordinated USVs to alter their individual operating plans to mitigate for their absence (iv) functionality to transmit, during the spatial performance, instructions to the set of coordinated USVs to dock with one another to form a docked USV structure (v) functionality to receive collision data from a subset of the USVs. The collision data can include information about a collision event between one or more USVs or between a USV and an external object (vi) functionality to interpolate collision details about a docked USV structure using the collision data. The spatial coordination module 152 can be configured to use the interpolated collision details to alter individual operating plans of at least a subset of the set of coordinated USVs (vii) functionality to transmit a request to a subset of the set of coordinated USVs to land coupled with one another (viii) functionality to utilize an externally operated camera device of the USV to align the latching mechanism of the USV with the latching mechanism of a proximate USV.

In one embodiment, the spatial coordination module 152 can further display a realtime stream of the docking operation to a remote human operator, enabling human assisted docking. The human operator can remotely control one or more USVs or docked USV structures to perform the docking operation.

Sequential Docking

In one or more embodiments, the spatial coordination module 152 includes functionality to execute, during the spatial performance and using the latching mechanism 120, multiple sequential docking operations (i.e., a multi-phase docking operation) involving different subsets of the USV swarm 200 to form a docked USV structure. For example, the spatial coordination module 152 can be configured to transmit instructions to a subset of the USV swarm 200 to form a mid-phase docked USV structure. The mid-phase structure is the result of a one or more sub-phases of a multi-phase docking operation, and can include any docked subset of the USVs. In one example, the spatial coordination module 152 transmits instructions to concurrently form multiple mid-phase USV structures, and subsequently transmits instructions to dock the mid-phase USV structures with one another to form a final docked USV structure. Any combination of docking operations can be performed in accordance with various embodiments.

In one or more embodiments, the spatial coordination module 152 includes functionality to cause a docked USV structure to enter a docked operating mode. Docked operating mode may involve the docked USV structure operating with less variation in attitude, for example. The spatial coordination module may be configured to communicate with specific USVs included in the docked USV structure to enable or disable sensors and/or propulsion devices in order to facilitate docked operating mode. Furthermore, the spatial coordination module 152 can be configured to transmit instructions to one or more of the coordinated USVs of the docked structure in response to realtime sensory information and/or in order to otherwise facilitate, modify, or control the spatial performance.

In one or more embodiments, the spatial coordination module 152 includes functionality to communicate with one or more of the coordinated USVs indirectly. The spatial coordination module 152 may not be within communication range of some subset of the coordinated USVs, or may not be capable or configured to directly communicate with all of the USVs. In this case, the coordinated USVs can be configured to propagate communication from the spatial coordination module 152 in a distributed manner. Thus, USVs can form a distributed peer-to-peer wireless network that enables instructions to and from the spatial coordination module 152 to be propagated across far reaching distances and across multiple heterogeneous USV devices.

Additional Embodiments

In one or more embodiments, a collision is not actively avoided. An exoskeleton with a bump guard may be included on each USV, and the USVs may be configured to blindly replay their operating plans without performing any real-time modification. Light collisions of inter-USV bumping can be a normal part of the replay process. Thus, in this embodiment, collisions are not actively avoided. With the help of an exoskeleton with a bump guard and optionally dampening mechanism, deviations resulting from collisions can be reduced or eliminated.

In one or more embodiments, a realtime control process for keeping a minimum threshold distance between any two proximal USVs at some range is not implemented. Each USV may operate independently according to its operating plan.

In one or more embodiments, both the docked USV structure and/or individual USVs are configured to carry a payload. The payload can include a flag, banner, fireworks that are then activated during the spatial performance (e.g., mid-flight), confetti that is then dropped or released mid-performance, and/or any other items relevant to the spatial performance.

In one of more embodiments, the docked USV structure can be configured to form a supported bridge across a land gap. The structure may be docked in another location (e.g., mid-flight) and then moved to the position of the land gap or may be docked directly at the location of the land gap. The bridge may be capable of supporting a load and may form a surface for other vehicles to traverse across the land gap (e.g., a river). This may be utilized for recreational, military, space, or other applications in which human presence or labor in construction of a bridge is not feasible or desired.

Problems Solved

Embodiments of the invention may have one or more of the following advantages:

In one or more embodiments, it may be possible to perform offline computation of various aspects of the spatial performance, e.g., spatial paths of one or more USVs, and to execute the spatial performance with little or no human involvement. Furthermore, it may be possible to replay (e.g., reproduce or re-execute) the spatial performance involving the same or different USVs at the same or different locations without the need to perform additional design or programming.

In one or more embodiments, it may be possible to avoid, avert, or mitigate the impact of collisions during the spatial performance. One or more dampening mechanisms may prevent USVs from being damaged or from being diverted from their spatial paths during the spatial performance. In the case when a more severe divergence occurs, it may be possible to modify the spatial performance in order to minimize the impact to the viewing audience.

In one or more embodiments, it may be possible to perform one or more mid-performance docking operations. This may enable functionality of a docked USV structure, may allow for rendering of physical objects using multiple USVs in three-dimensional space, may enable charging of multiple USV devices, and/or may allow for a variety of other visual performance enhancements.

In one or more embodiments, USV communication module 126 includes radio chipsets such as model cyrf6936 from Cypress, model NRF24L01 from Nordic, model A7105 from AMICCOM, or model CC2500 from Ti. Bluetooth, Wifi, UWB (e.g. DecaWave) or other device types can be used in accordance with various embodiments.

Although the components of the systems of FIGS. 1 and 2 are depicted as being directly communicatively coupled to one another, this is not necessarily the case. For example, one or more of the components of the systems may be communicatively coupled via a distributed computing system, a cloud computing system, or a networked computer system communicating via the Internet.

Flowcharts

Figure 9:
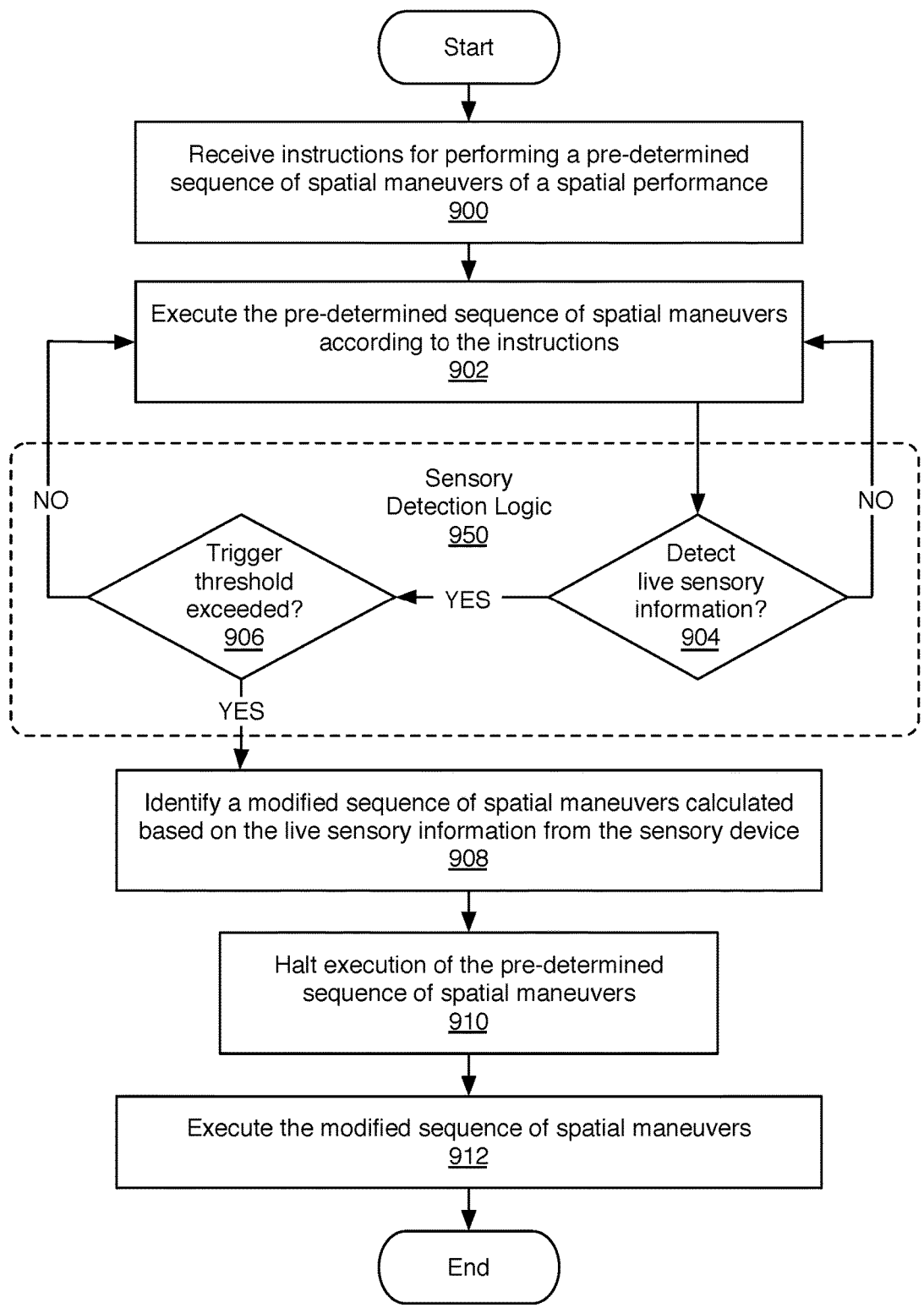
FIGS. 9 and 10 show flowcharts in accordance with one or more embodiments.

FIG. 9 shows a flowchart of an exemplary method for participating in a multi-USV spatial performance. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 9 should not be construed as limiting the scope of the invention. The flowchart of FIG. 9 may be described with continued reference to the exemplary systems of FIGS. 1 and 2, described above, though the method is not limited to those embodiments.

In STEP 900, instructions are received for performing a pre-determined sequence of aerial maneuvers of a spatial performance. The instructions may be received offline or online, and may be received from another USV participating in the spatial performance or from an external spatial coordination module (e.g., spatial coordination module 152, of FIG. 2). The instructions may include other information, such as operation of one or more sensory input/output devices, and other parts of the spatial performance for which the USV is responsible. The instructions may further be a "master set" which includes detailed operation of multiple USVs, or may be specific to the particular USV that receives them. In STEP 902, the pre-determined sequence of aerial maneuvers is executed according to the instructions.

In STEP 904, live sensory information is detected. Although detection of the sensory information is depicted by the flowchart as a loop, one or more sensory devices may be configured to "listen" for sensory information and may communicate that information upon detection according to any known method of sensory communication. The live sensory information may be detected from onboard sensors, may be communicated by one or more coordinated USVs participating in the spatial performance, and/or may be received from an external spatial coordination module, in accordance with various embodiments. Live sensory information may include a variety of different types of information including, but not limited to, information about the operation of the USV, information about operation of proximate USV(s), detection of external objects/stimuli, weather/climate information, or any other stimuli that may be relevant to execution of the spatial performance.

After detecting live sensory information, in STEP 906, it is determined whether a trigger threshold for responding to the live sensory information is exceeded. If it is determined that the trigger threshold is exceeded, the process proceeds to Step 908. If it is determined that the trigger threshold is not exceeded, the process returns to STEP 902 by continuing to execute the predetermined sequence of aerial maneuvers. An example of external stimuli which may not exceed the trigger threshold may be a minor collision that does not significantly affect position or operation of the USV. Conversely, a more serious impact that breaks a sensor or causes the position of the USV to be altered in a manner that moving it back into position may conflict with the spatial path(s) of other USVs may exceed the trigger threshold.

Although STEPS 904 and 906 are depicted in sequence to STEP 902, the actual process may involve concurrently listening for sensory information while executing maneuvers of the spatial performance, and may further involve calculating modifications to the spatial performance (as depicted in STEP 908) during execution of the performance. In this way, sensory detection logic 950 and realtime response (908) may be performed concurrently with execution of the spatial performance. Sensory detection logic 950 may be performed, for example, by a motion processing unit (MPU) executing on a microcontroller of the USV.

In STEP 908, a modified sequence of spatial maneuvers is calculated based on the live sensory information from the sensory device. This may include calculating a return path to return a USV to its intended position in the spatial performance after a collision event. Modifications may also be made to sensory outputs, payload movement, and/or a variety of other aspects of the USV's involvement in the spatial performance. Thus, the modifications are, in one embodiment, intended to restore one or more USVs to their intended state of participating in the spatial performance after some interruption of that performance has taken place.

In STEP 910, execution of the pre-determined sequence of aerial maneuvers is halted and, in STEP 912, the modified sequence of aerial maneuvers is executed. The steps may have already been halted after a failure or interruption of one or more USVs, which triggered the live sensory information of STEP 904. The USV can be in communication with an external spatial coordination module or may independently perform the sensory detection logic 950, e.g., using an onboard spatial control module.

Figure 10:
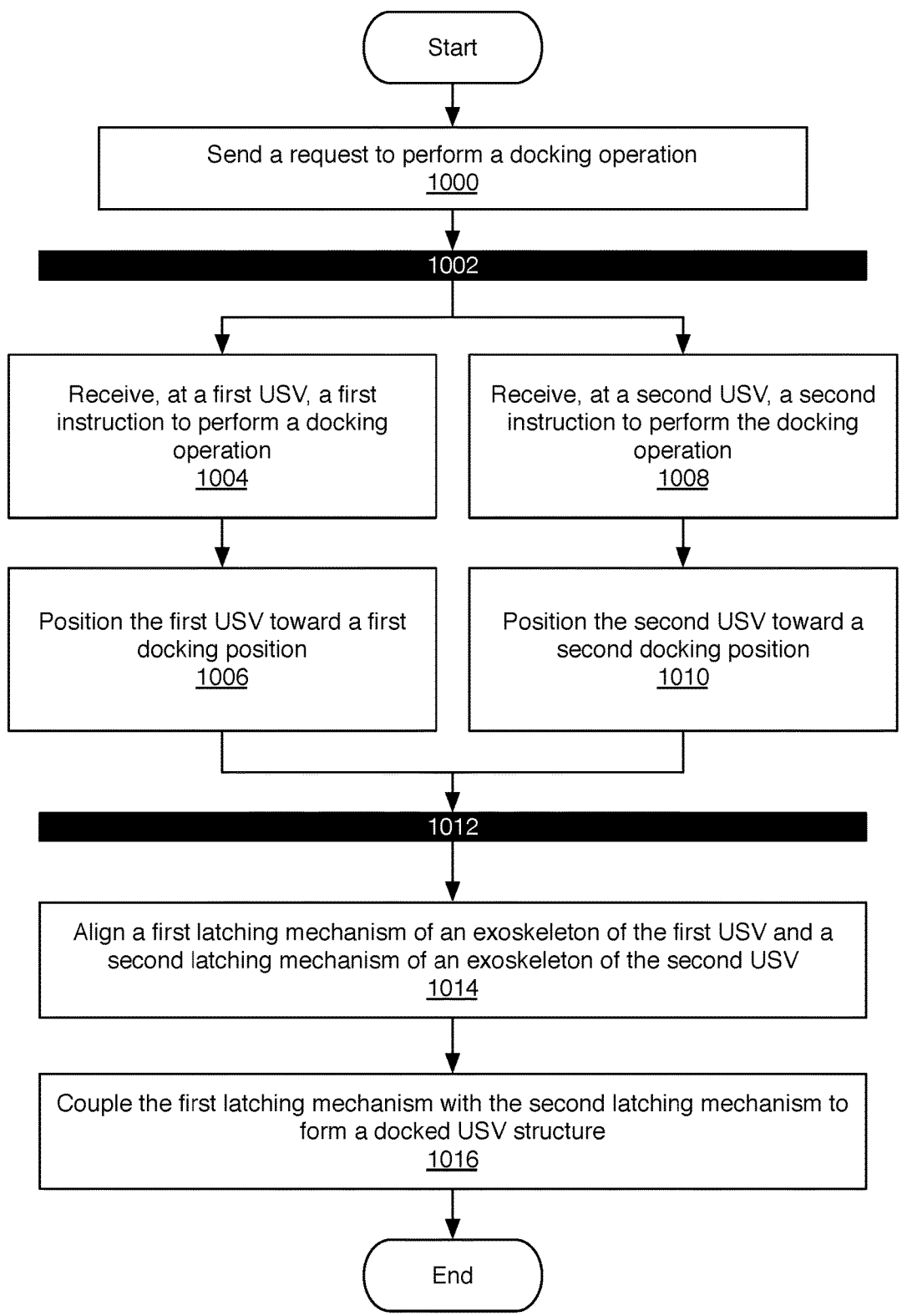

FIG. 10 shows a flowchart of an exemplary method for performing a docking operation. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 10 should not be construed as limiting the scope of the invention. The flowchart of FIG. 10 may be described with continued reference to the exemplary systems of FIGS. 1 and 2, described above, though the method is not limited to those embodiments.

In STEP 1000, a request to perform a docking operation is sent to two or more coordinated USVs. In one or more embodiments, the request may be sent concurrently or via separate asynchronous or distributed requests. In the example of a set of coordinated USVs which are remotely controlled in real time, a human operator using an interface of a spatial coordination module may initiate the request. Alternatively, the request may come from a proximal USV executing a predefined spatial performance plan. In this example, even though the spatial performance is predefined, individual USVs may communicate the request to dock to one another based on their arrival at a predefined docking position or some other signal indicating a readiness to dock.

Blocks 1002 and 1012 designate synchronization points during which parallel operations of the process are temporally synchronized. For example, the coordinated USVs that are executing parallel steps of the method in STEPS 1004-1010 cannot proceed to STEP 1014 without synchronizing their pre-docking positions.

In STEP 1004, a first instruction to perform a docking operation is received at a first USV. In STEP 1008, a second USV receives a second instruction (or alternately, the same instruction) to perform the docking operation. The instruction may be read from a storage of the USV or may be received from an external source. If the instructions are obtained offline, the instruction may be "received" based on a predefined set of conditions being satisfied, indicating a readiness of the USV to perform the docking operation. In STEP 1006, the first USV is positioned toward a first docking position and in STEP 1010 the second USV is positioned toward a second docking position adjacent to the first docking position. The positioning of the USVs may be performed independently and at different times during the spatial performance. In one embodiment, both USVs must be in position in order to initiate latching.

In STEP 1014, a first latching mechanism of an exoskeleton of the first USV and a second latching mechanism of an exoskeleton of the second USV are aligned. The alignment may be separate from the positioning of the USVs, or may be the same. In other words, in one or more optional embodiments, one or both of the latching mechanisms of the USVs may need to physically align before coupling. In one embodiment, the adjacent docking positions of STEPS 1006 and 1010 may still involve a distance of separation between the USVs. STEP 1014 may involve closing this separation to make contact between the USVs before initiating coupling of the latching mechanisms.

In STEP 1016, the first latching mechanism is coupled with the second latching mechanism to form a docked USV structure. This may involve running an electric current through an electromagnetic latch, turning a lever to close a T-style or deadbolt latch, or any other mechanism for securing the latch, in accordance with various embodiments.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

While the present disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because other architectures can be implemented to achieve the same functionality.

Embodiments may be implemented on a specialized computer system. The specialized computing system can include one or more modified mobile devices (e.g., laptop computer, smart phone, tablet computer, or other mobile device), desktop computers, servers, blades in a server chassis, or any other type of computing device(s) that include at least the minimum processing power, memory, and input and output device(s) to perform one or more embodiments.

For example, the spatial coordination module 152 of FIG. 2, the spatial control module 124 of FIG. 1, and/or some components thereof may be implemented using such a specialized computing system. The computer processor(s) of the computing system can implement/execute the module(s) stored in memory or persistent storage, where they can be accessed and processed by the computer processor(s). One or more of said computer processors can be a special-purpose processor where software instructions are incorporated into the actual processor design.

One or more elements of the aforementioned systems (e.g., of FIGS. 1 and 2) may be located at a remote location and connected to the other elements over a network. Further, embodiments may be implemented on a distributed system having a plurality of nodes, where each portion may be located on a subset of nodes within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment implemented in a USV swarm. Cloud computing environments may provide various services and applications via a wireless communication protocol (e.g., RF transmission). Components of the system(s) may be accessible through a Web browser or other remote interface.

One or more elements of the above-described systems (e.g., FIGS. 1 and 2) may also be implemented using software modules that perform certain tasks. These software modules may include script, batch, routines, programs, objects, components, data structures, or other executable files that may be stored on a computer-readable storage medium or in a computing system. These software modules may configure a computing system to perform one or more of the example embodiments disclosed herein. The functionality of the software modules may be combined or distributed as desired in various embodiments. The computer readable program code can be stored, temporarily or permanently, on one or more non-transitory computer readable storage media. The non-transitory computer readable storage media are executable by one or more computer processors to perform the functionality of one or more components of the above-described systems (e.g., FIGS. 1 and 2) and/or flowcharts (e.g., FIGS. 9 and 10). Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

It is understood that a "set" can include one or more elements. It is also understood that a "subset" of the set may be a set of which all the elements are contained in the set. In other words, the subset can include fewer elements than the set or all the elements of the set (i.e., the subset can be the same as the set).

While the invention has been described with respect to a limited number of embodiments, those skilled in the art, having benefit of this disclosure, will appreciate that other embodiments may be devised that do not depart from the scope of the invention as disclosed herein.

What is claimed is:

1. An unmanned spatial vehicle (USV) for participating in a multi-USV performance in three dimensional space, comprising:
a computer processor;
a sensory device configured to detect live sensory information relative to a second USV participating in the performance in proximity to the USV, wherein the sensory device is configured to provide collision data to a spatial control module; and
the spatial control module executing on the computer processor and configured to enable the computer processor to:
receive instructions for performing a pre-determined sequence of spatial maneuvers of the performance;
begin execution of the pre-determined sequence of spatial maneuvers according to the instructions;
identify a modified sequence of spatial maneuvers calculated based on the live sensory information from the sensory device, wherein the live sensory information includes collision data; and
in response to receiving the collision data, halt execution of the pre-determined sequence of spatial maneuvers and execute the modified sequence of spatial maneuvers.

2. The USV of claim 1, further comprising:
an exoskeleton surrounding the sensory device and the spatial control module, the exoskeleton comprising:
a set of sensory devices; and
at least one latching mechanism operable to facilitate a docking operation with a proximate USV.

3. The USV of claim 1, wherein the spatial control module is further configured to enable the computer processor to:
execute, during the performance and using the latching mechanism, the docking operation causing the USV to dock with the second USV and a plurality of coordinated USVs to form a docked USV structure; and
after formation of the docked USV structure, modifying an individual operating mode of the USV to enable the docked USV structure to operate with less variation in attitude than the USV prior to docking.

4. The USV of claim 3, wherein modifying the individual operating mode comprises:
disabling the sensory device, wherein peripheral sensory devices of the docked USV structure remain enabled; and
enabling at least one ancillary propulsion device configured to enable the docked USV structure to operate with less variation in attitude.

5. The USV of claim 1, wherein the spatial control module is further configured to enable the computer processor to:
execute a landing operation causing the docked USV structure to land upon completion of the performance.

6. The USV of claim 1, wherein the spatial control module is further configured to enable the computer processor to:
receive second instructions for performing a second pre-determined sequence of spatial maneuvers associated with the performance; and
begin executing the second pre-determined sequence of spatial maneuvers.

7. The USV of claim 1, wherein the exoskeleton further comprises a set of optical devices, and wherein the spatial control module is further configured to enable the computer processor to:
receive further instructions about operating the optical devices to emit light in coordination with the performance to provide a visual display.

8. The USV of claim 1, wherein the multi-USV performance involves a set of coordinated USVs including the first USV, and wherein the spatial control module is further configured to enable the computer processor to:
receive information about a deviation from the performance;
use the information about the deviation and the live sensory information from the sensory device to calculate the modified sequence of spatial maneuvers; and
transmit a notification of the modified sequence of spatial maneuvers to an external spatial coordination module.

9. The USV of claim 1, wherein the spatial control module is further configured to enable the computer processor to:
determine that the USV cannot continue participating in execution of the performance; and
request a second USV to replace the USV in execution of the performance.

10. The USV of claim 1, further comprising a guidance system configured to determine a set of points in space corresponding with a set of spatial path waypoints using a spatial navigation mechanism,
and wherein the sensory device comprises at least one selected from a group consisting of an inertial measurement unit (IMU), a compass, an altimeter, a GPS module, a payload measurement module, a timekeeping device, a camera, a range sensor, and a thermometer.

11. A system for coordinating a multi-unmanned spatial vehicle (multi-USV) performance involving a set of coordinated USVs, comprising:
a computer processor;
a spatial coordination module executing on the computer processor and configured to enable the computer processor to:
transmit, to the set of coordinated USVs, separate instructions for performing a pre-determined sequence of spatial maneuvers;
receive, during the performance, live sensory information from a sensory device of a first USV of the set of coordinated USVs, wherein the live sensory information is relative to a second USV of the set of coordinated USVs participating in the performance in proximity to the first USV, and wherein the sensory device of the first USV is configured to provide collision data to the spatial control module; and
calculate a modified sequence of spatial maneuvers based on the live sensory information; and
transmit the modified sequence of spatial maneuvers to a subset of the coordinated USVs.

12. The system of claim 11, wherein the first USV and the second USV each include a set of optical devices, and wherein the spatial coordination module is further configured to enable the computer processor to:
  receive optical instructions for operating the optical devices to emit light in coordination with the performance to provide a visual display; and
  modify the optical instructions based on the live sensory information.

13. The system of claim 11, wherein the spatial coordination module is further configured to enable the computer processor to:
  receive information, from the set of coordinated USVs, about a deviation from the performance; and
  attempt to correct the deviation by transmitting modification data to at least a subset of the coordinated USVs.

14. The system of claim 11, wherein the spatial coordination module is further configured to enable the computer processor to:
  determine that the first USV cannot continue participating in execution of the performance; and
  cause a subset of the set of coordinated USVs to alter their individual operating plans to mitigate for absence of the first USV.

15. The system of claim 11, wherein the spatial coordination module is further configured to enable the computer processor to:
  transmit, during the performance, instructions to the set of coordinated USVs to dock with one another to form a docked USV structure;
  receive collision data from a subset of the USVs of the docked USV structure, wherein the collision data includes information about a collision event;
  interpolate collision details about the docked USV structure using the collision data; and
  use the interpolated collision details to alter individual operating plans of at least a subset of the set of coordinated USVs.

16. The system of claim 11, wherein the spatial coordination module is further configured to enable the computer processor to perform a multi-phase docking operation by:
  transmitting instructions to different subsets of the coordinated USVs to perform multiple sequential docking operations with one another, each docking operation connecting a different subset of the coordinated USVs, resulting in formation of a docked USV structure, wherein each of the multiple sequential docking operations involves movement along a different axis.

17. The system of claim 11, wherein the spatial coordination module is further configured to enable the computer processor to perform a multi-phase docking operation by:
  transmitting instructions to different subsets of the coordinated USVs to perform multiple concurrent docking operations with one another resulting in formation of multiple mid-phase USV structures, each concurrent docking operation connecting a different subset of the coordinated USVs; and
  transmitting instructions to the multiple mid-phase USV structures to dock with one another resulting in formation of a final docked USV structure.

18. The system of claim 11, wherein the spatial coordination module is further configured to enable the computer processor to:
  transmit, during the performance, instructions to the set of coordinated USVs to dock with one another to form a docked USV structure;
  after formation of the docked USV structure, cause the set of coordinated USVs to enter a docked operating mode to enable the docked USV structure to operate with less variation in attitude, wherein entering the docked operating mode involves:
    deactivating sensors and propulsion devices of a subset of the coordinated USVs after forming the docked USV structure, and
    use sensors and propulsion devices of a remainder of the coordinated USVs to perform docked spatial maneuvers using the docked USV structure.

19. A method for performing a multi-USV performance involving a set of coordinated USVs, comprising:
  beginning execution of the performance by the set of coordinated USVs;
  detecting, independently and by a subset of the coordinated USVs, a failure of a first USV in executing a portion of the performance, wherein the failure is a collision, and wherein the subset of the coordinated USVs are in proximity to the first USV;
  propagating distributed communication of the failure, by the subset of the coordinated USVs, to a remainder of the set of coordinated USVs;
  independently calculating, by at least a second USV of the set of coordinated USVs, modifications to the performance based on receiving distributed communication of the failure; and
  executing a portion of the modifications to the performance by the second USV.

20. The method of claim 19, wherein detecting the failure by the subset of the coordinate USVs comprises detecting an absence of the first USV at a spatial path waypoint by at least one sensory device of the subset of the coordinated USVs.

* * * * *